(12) United States Patent
Tachihata et al.

(10) Patent No.: US 6,226,587 B1
(45) Date of Patent: May 1, 2001

(54) STABILITY CONTROL SYSTEM FOR AUTOMOTIVE VEHICLE

(75) Inventors: Tetsuya Tachihata; Haruki Okazaki; Tomoji Izumi; Toshiaki Tsuyama, all of Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/113,188

(22) Filed: Jul. 10, 1998

(30) Foreign Application Priority Data

Jul. 11, 1997 (JP) ................................... 9-186979

(51) Int. Cl.[7] .............................. B60T 8/00; B60T 10/00; G06F 7/00; G06F 17/00
(52) U.S. Cl. ................................. 701/72; 70/71; 303/146; 303/147; 303/148; 303/149-151
(58) Field of Search .................................. 701/72, 71, 70; 303/146, 147, 148, 149, 150, 151, 152

(56) References Cited

U.S. PATENT DOCUMENTS

| | | | | |
|---|---|---|---|---|
| 5,915,800 | * | 6/1999 | Hiwatashi et al. | 303/146 |
| 5,927,421 | * | 7/1999 | Fukada | 180/197 |
| 5,928,302 | * | 7/1999 | Fukada | 701/71 |
| 5,931,546 | * | 8/1999 | Nakashima et al. | 303/146 |
| 5,944,393 | * | 8/1999 | Sano | 303/146 |
| 5,947,221 | * | 9/1999 | Taniguchi et al. | 180/197 |
| 6,027,183 | * | 2/2000 | Katayose et al. | 303/146 |
| 6,039,411 | * | 3/2000 | Tozu et al. | 303/116.1 |

FOREIGN PATENT DOCUMENTS 6-115418    4/1994   (JP) .

* cited by examiner

Primary Examiner—William A. Cuchlinski, Jr.
Assistant Examiner—Ronnie Mancho
(74) Attorney, Agent, or Firm—Nixon Peabody LLP; Donald R. Studebaker

(57) ABSTRACT

An automotive vehicle stability control system determined which is a main cause of a change in a change rate of a yaw rate difference of an actual yaw rate from a target yaw rate between a change in the actual yaw rate and a change in the target yaw rate when the change rate of the yaw rate difference exceeds a specified change rate, increase threshold slip angle for starting braking control based on slip angle following the driver's intention when the main cause is the change in the actual yaw rate and increases an upper limit of target slip angle so as to allow the target slip angle to be increased according to a driver's steering operation when the slip angle preferential braking control takes place.

22 Claims, 23 Drawing Sheets

TARGET SLIP ANGLE LIMIT SETTING

STABILITY CONTROL SYSTEM FOR AUTOMOTIVE VEHICLE

BACKGROUND OF THE INVENTION

1. Field of the Invention

The invention relates to a stability control system for an automotive vehicle, and, more particularly, to an automotive vehicle stability control system which controls a slip and a spin of an automotive vehicle during turning a corner or urgently making its way around an obstruction or upon an occurrence of a sudden change in road condition.

2. Description of the Related Art

There have been proposed various types of dynamic stability control systems for controlling a slip and a spin of a vehicle based on running state variables of the vehicle including a yaw rate and a steering angle while the vehicle turns a corner or urgently makes its way around an obstruction or when a sudden change occurs on road condition. One of such dynamic stability control systems described in, for example, Japanese Unexamined Patent Publication No. 6-115418 changes the condition for commencement of independent braking control of the wheels according to running state variables to effect the braking control only when really necessary.

While it is necessary to execute direction control of the vehicle based on a slip angle as soon as possible when a change in vehicle direction is caused due to disturbances of, for example, surface condition of a road on which the vehicle is running, however, when a change in vehicle direction is caused by the driver's intention, early execution of the vehicle direction control leads to undesirable running actions against the driver's driving operation.

SUMMARY OF THE INVENTION

It is an object of the invention to provide a stability control system which provides stable execution of dynamic stability control and realizes a reflection of driving operation by the driver in the dynamic stability control according to causes of a change in running direction.

The foregoing object of the present invention is achieved by providing a dynamic stability control system for controlling controlled variables with which braking units for front and rear wheels are managed to apply brakes to the respective front and rear wheels independently so as to control the vehicle in running direction. The dynamic stability control system determines state variables relating to a target direction based on running state variables including a state variable relating to a running direction of the vehicle, such as a slip angle, and performs braking control by controlling the controlled variable, such as a yaw rate, for the braking units to apply brakes to the front and rear wheels independently so as to make the directional state variable converge at the target directional state value when a difference between the directional state variable and the target directional state value is greater than a threshold value. At least one of the threshold value and the controlled variable is changed so as to make the braking control harder to take place when the difference greater than the threshold value has been caused due to a change in the target directional state value than when due to a change in the directional state variable.

With the dynamic stability control system of the invention, the controlled variable is controlled according to main causes, i e. a change in directional state variable and a change in target directional state value, due to which the difference between these directional state values greater than the threshold value occurs, so that the dynamic stability control is always executed successfully and stably even upon an occurrence of a change in vehicle running direction due not only to disturbances resulting from changes in road condition but also to the driver's intention to steer the vehicle.

BRIEF DESCRIPTION OF THE DRAWINGS

The foregoing and other objects and features of the present invention will be clearly understood from the following detailed description of preferred embodiments when read in conjunction with the accompanying drawings in which.

DETAILED DESCRIPTION OF THE PREFERRED EMBODIMENT

Figure 1:
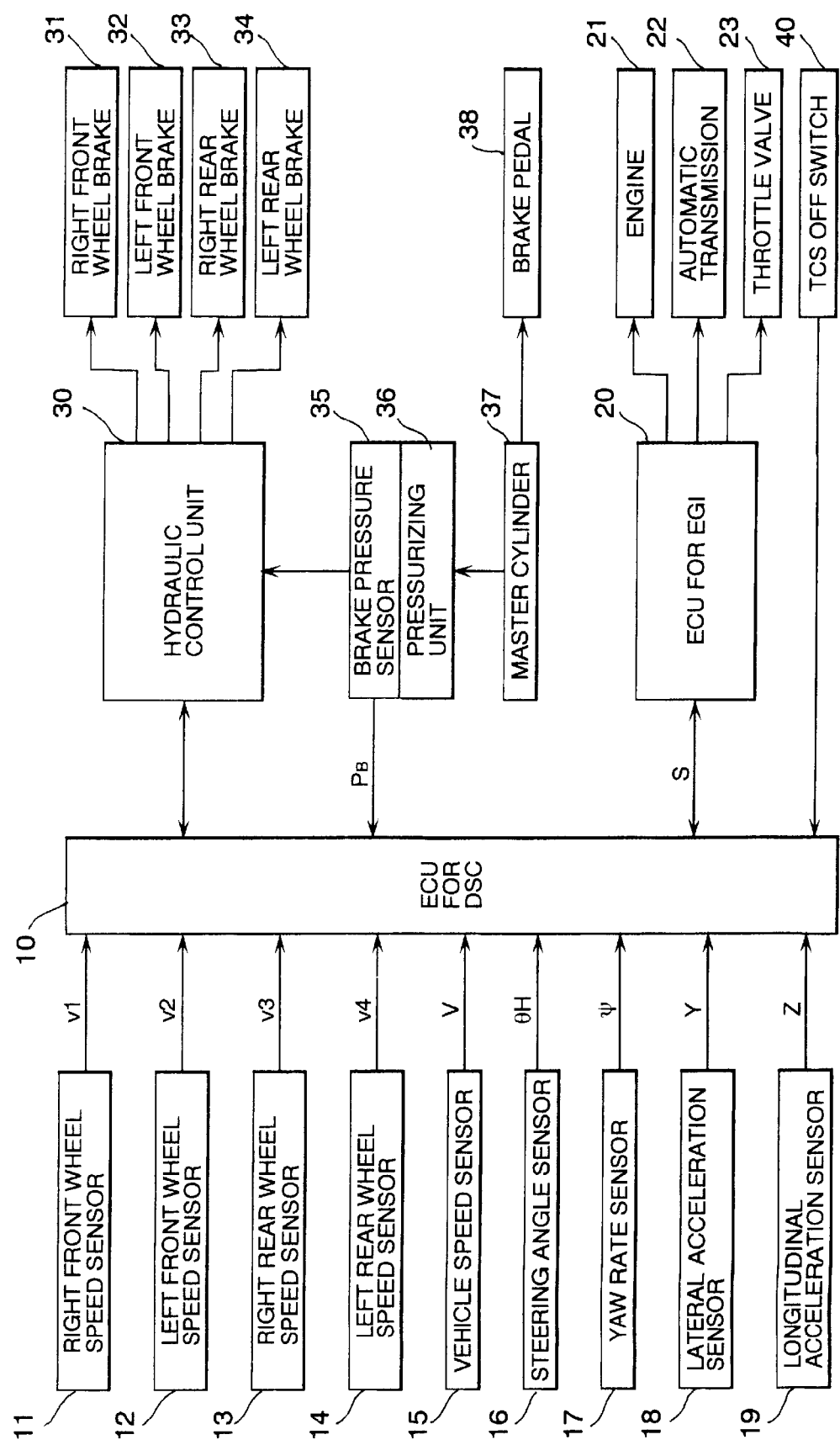
FIG. 1 is a block diagram showing a stability control system for an automotive vehicle according to an embodiment of the invention.

Referring to the drawings in detail and, in particular, to FIG. 1 shows a stability control system for an automotive vehicle in accordance with an embodiment of the invention which controls braking force applied to wheels to restrain the vehicle from slipping or spinning during turning a corner or urgently making its way around an obstruction or when a sudden change in condition occurs on a road on which the vehicle is running. The vehicle is equipped with hydraulic disk brake units, namely a right front (RF) brake unit 31, a left front (LF) brake unit 32, a right rear (RR) brake unit 33 and a left rear (LR) brake unit 32, A hydraulic pressure control unit 30, which controls hydraulic pressure introduced into a wheel cylinder (not shown) of each brake unit 31, 32, 33, 34 to apply braking force to the related wheel, cooperates with a booster or pressure intensifier 36 and a master cylinder 37 for developing primary hydraulic pressure according to pressure of the driver's foot on a brake pedal 38. The primary hydraulic pressure is introduced into and intensified by the pressure intensifier 36 and then transmitted to the hydraulic pressure control unit 30. An electronic control unit (ECU) 10 provides control signals according to which the hydraulic pressure control unit 30 distributes the intensified hydraulic pressure to the respective hydraulic brake units 31–34. Further, the electronic control unit (ECU) 10 manages an anti-lock braking system and a traction control system (TCS). As is well known, the anti-lock braking system permits rapid straight line stop by preventing rear wheel lockup or all four wheels, and the traction control system prevents wheels from slipping relatively to a road surface by controlling driving force or braking force to the wheels during driving, steering, and driving both of which are well known in construction and operation to those skilled in the art. These control systems perform respective controls according to signals from various sensors. Specifically, the sensors includes wheel speed sensors 11–14 for detecting actual wheel speeds v1–v4 of the respective related wheels 31–34 and providing signals representative of the wheel speeds v1–v4, a vehicle speed sensor 15 for detecting an actual vehicle speed V and providing a signal representative of the vehicle speed V, a steering angle sensor 16 for detecting an actual steering angle θH and providing a signal representative of the steering angle θH of the front wheels, a yaw rate sensor 17 for detecting an actual yaw rate ψ generated on the vehicle and providing a signal representative of the yaw rate ψ, a lateral acceleration sensor 18 for detecting an actual lateral acceleration Y of the vehicle and providing a signal representative of the lateral acceleration Y and a longitudinal acceleration sensor 19 for detecting an actual longitudinal acceleration Z of the vehicle and providing a signal representative of the longitudinal acceleration Z. There are further provided a pedal pressure sensor 35 for detecting actual pedal pressure PB of the driver's foot on a brake pedal (not shown) and providing a signal representative of the pedal pressure PB and a traction control off-switch 40 for forcibly stopping traction or wheel spin control which will be described later and providing a traction control stop signal S. Each of these sensors 11–19 and 35 and the switch 40 is known in various types in the art and may take any well known type. The electronic control unit 10 for dynamic stablity control (DSC) cooperates with an electronic control unit 20 for electronic gasoline injection (EGI) which controls an engine 21, an automatic transmission and an engine throttle valve 23. These electronic control units 10 and 20 are comprised of a central control unit (CPU), a read only memory (ROM) and a random access memory (RAM) and perform programmed stability control and programmed engine control based on incoming signals from the sensors and switch described above.

The dynamic stability control restraints slips of front wheels or rear wheels by braking the wheels to generate and impart a turning moment and decelerating force to the vehicle. For example, when the rear wheels are on the verge of skidding or spinning while the vehicle is cornering, braking force is applied to an outside front wheel to generate and impart an outward moment to the vehicle so as thereby to prevent the vehicle from being dragged inward. On the other hand, when the vehicle is on the verge of drifting out of the course due to skidding of the front wheels, appropriate braking force is applied to each of the front and rear wheels to generate and impart an inward moment to the vehicle and simultaneously to apply decelerating force to the vehicle by controlling engine output torque so as thereby to prevent an increase in turning radius. As will be described in more detail, the electronic control unit 10 performs operations of an actual vehicle slip angle β of the vehicle and an actual yaw rate ψ based on signals representative of a vehicle speed V, a yaw rate ψ and a lateral acceleration Y from the sensors 15, 17 and 18, respectively, and an operation of a reference vehicle slip angle βref from the actual vehicle slip angle β which is used to obtain an estimated slip angle βcont necessary for the stability control. The electronic control unit 10 performs operations of a target vehicle slip angle βTR of the vehicle and a target yaw rate ψTR by which the attitude of the vehicle is determined based on the signals from the sensors 15, 17 and 18. These target vehicle slip angle βTR and target yaw rate ψTR are compared to the estimated slip angle βcont and the actual yaw rate ψ, respectively, so as to commence the stability control when the difference of the target vehicle slip angle βTR from the estimated slip angle βcont or the difference of the target yaw rate ψTR from the actual yaw rate ψ becomes greater than a threshold slip angle β0 or a threshold yaw rate ψ0 for commencement of the stability control, respectively.

Figure 2:
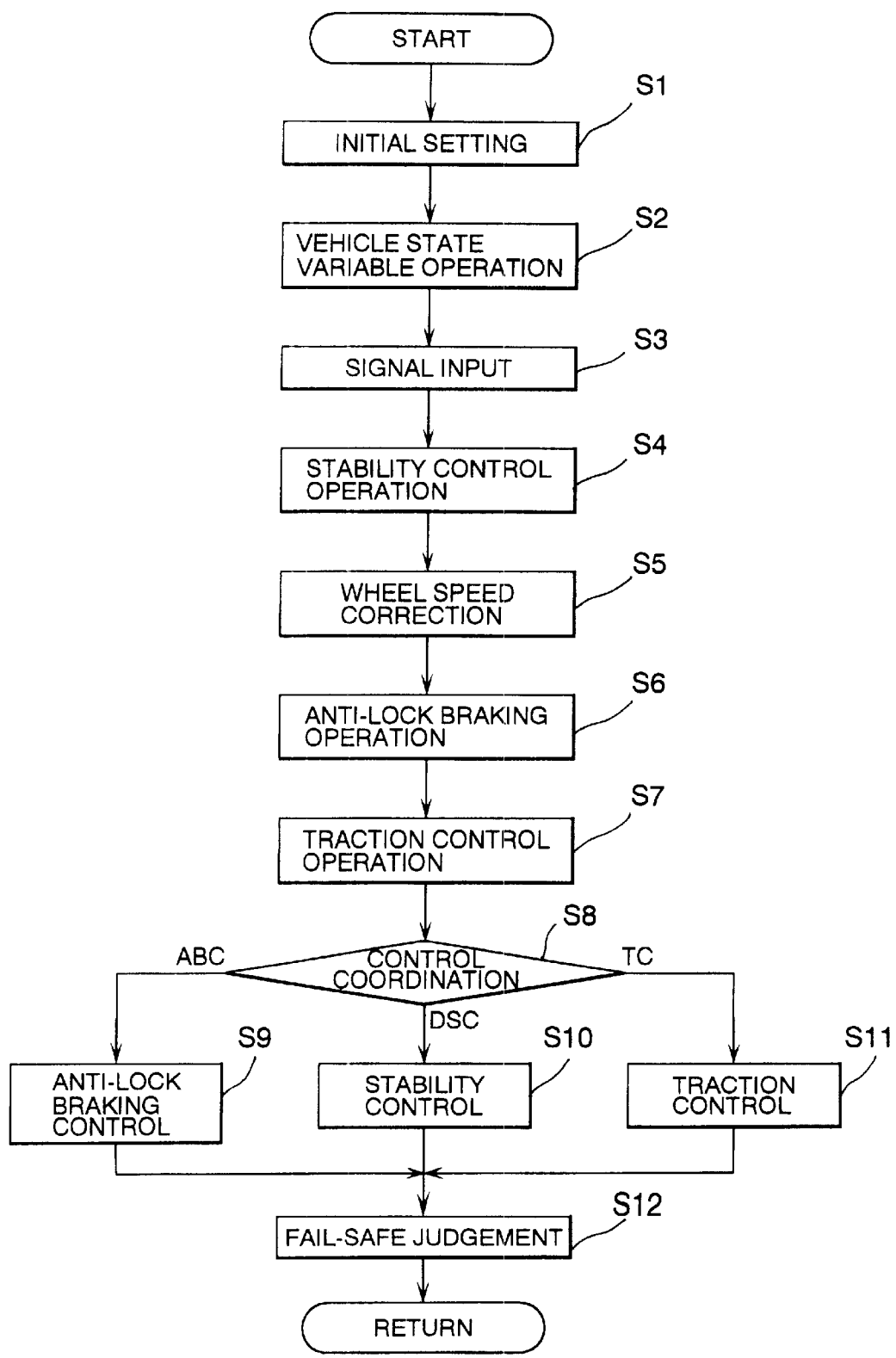
FIG. 2 is a flow chart illustrating a sequence routine of stability control.
Figure 3:
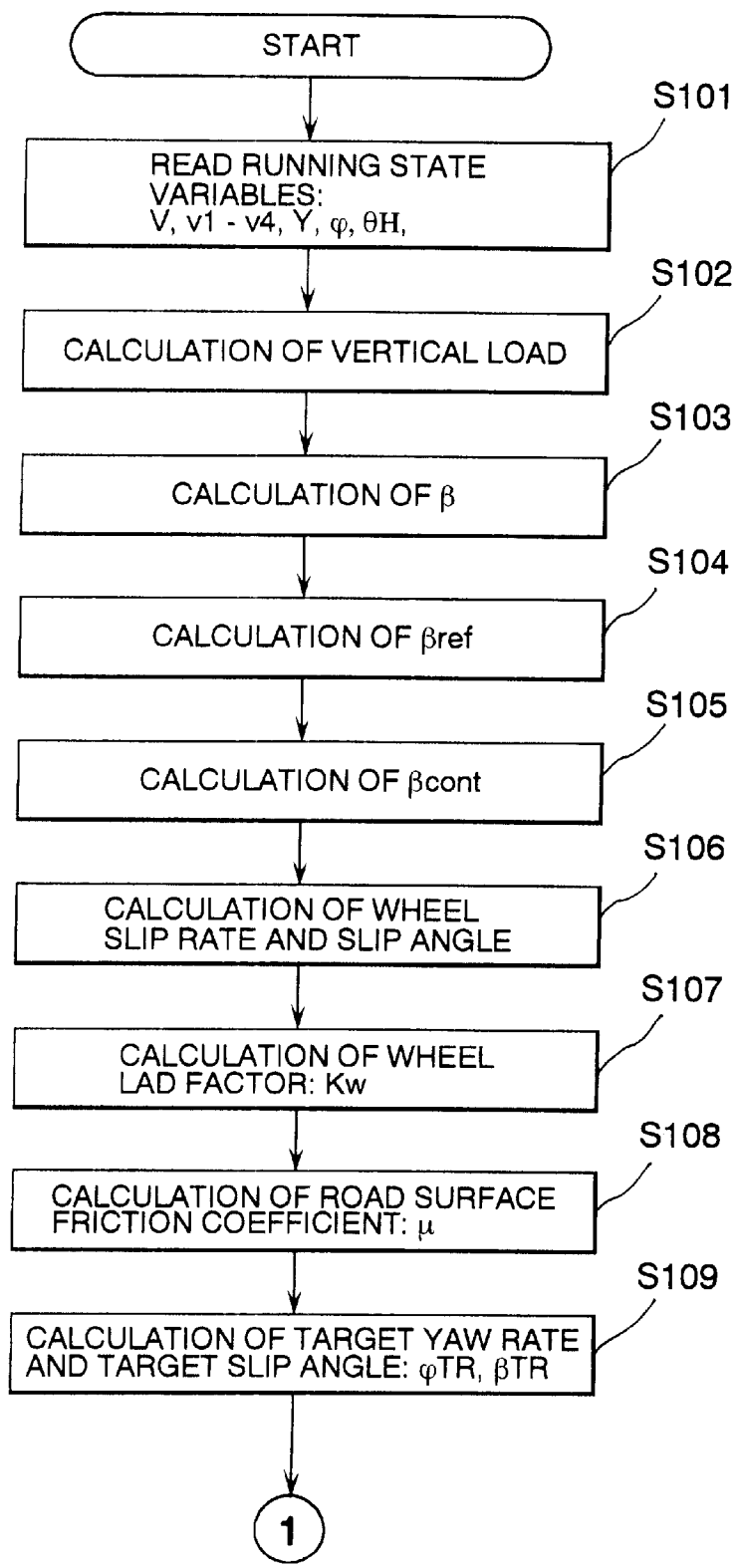
FIGS. 3–7 are a flow chart illustrating a sequence routine of operation of the stability control.
Figure 4:
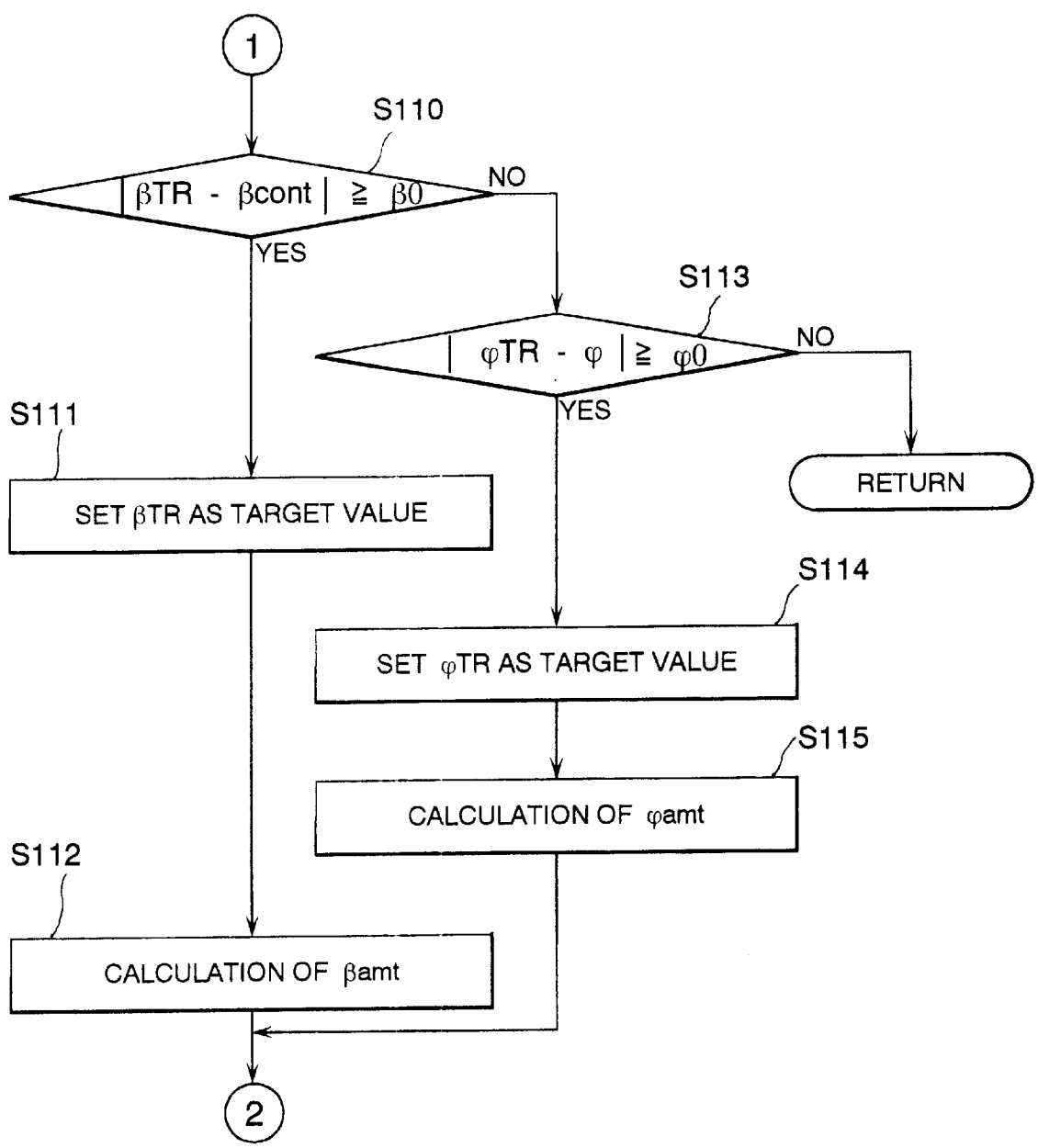
Figure 5:
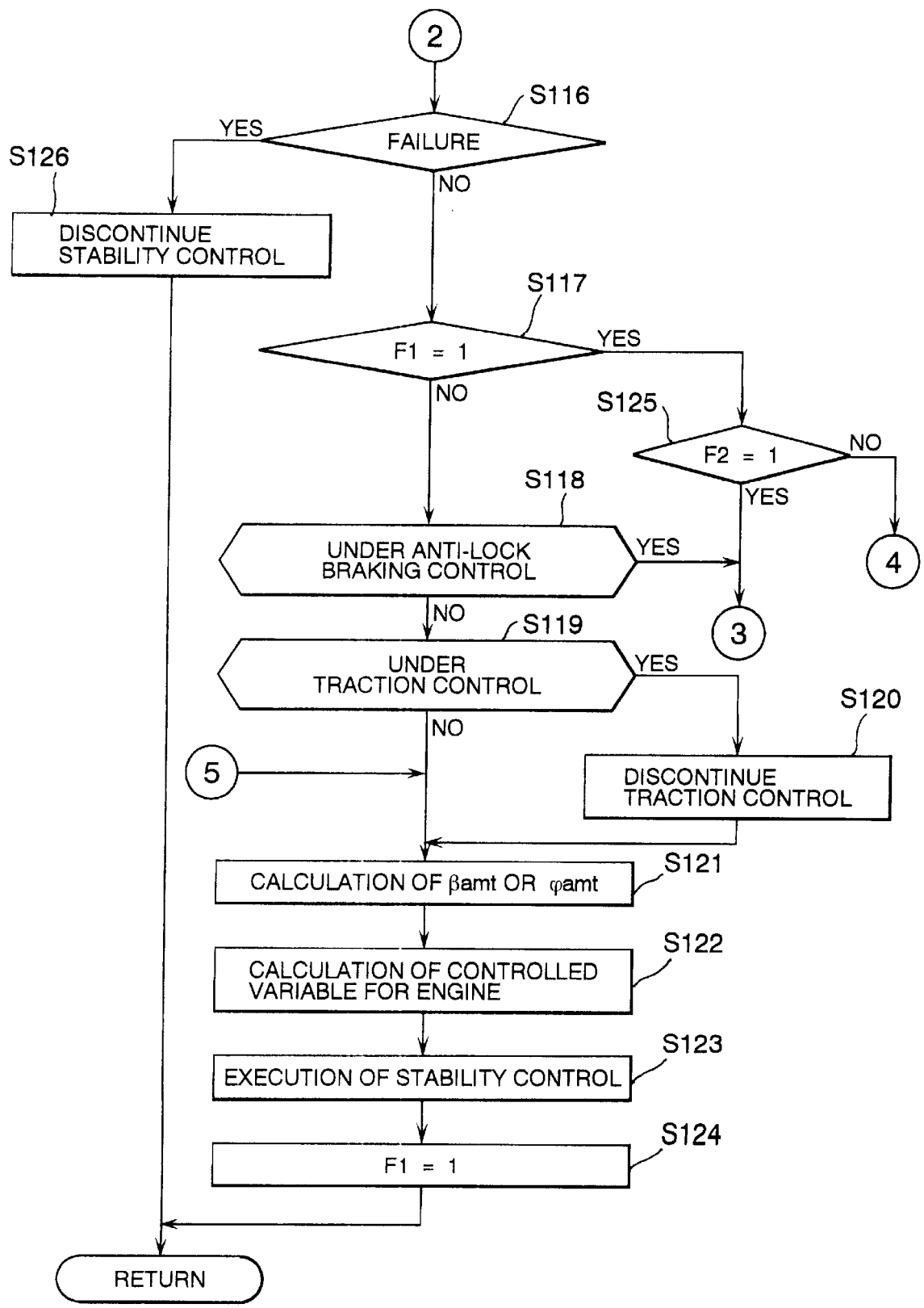
Figure 6:
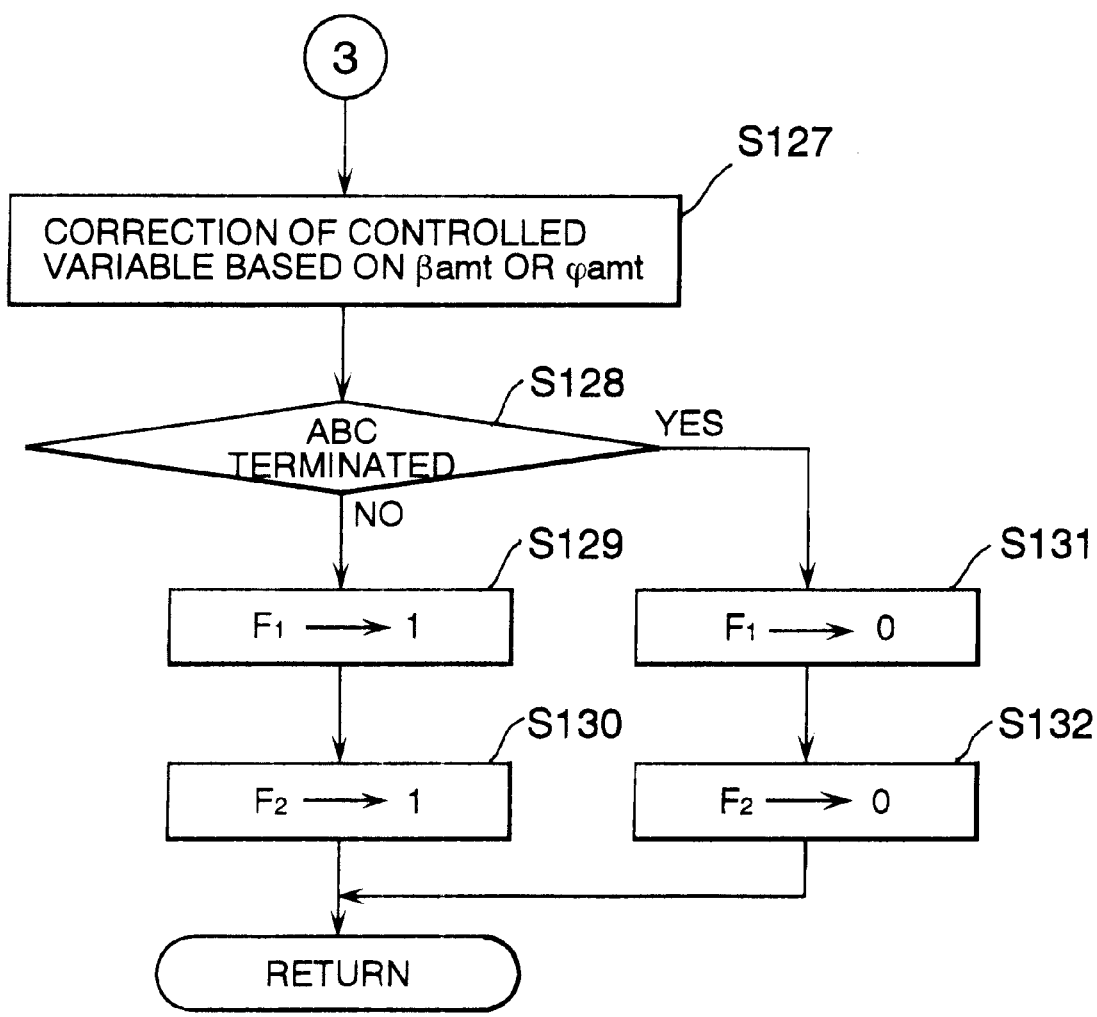
Figure 7:
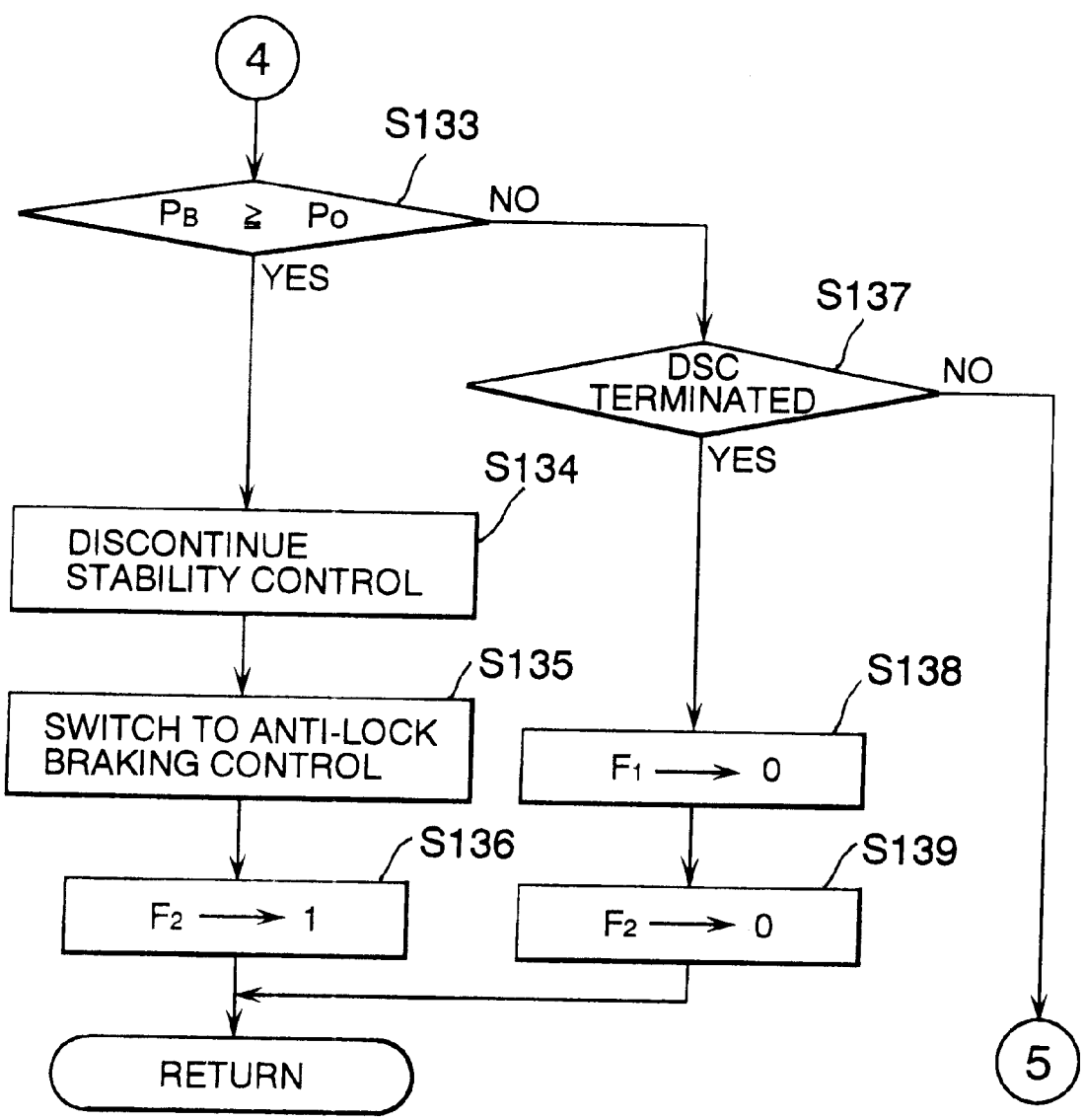

FIG. 2 shows a flow chart illustrating the stability control main sequence routine. When the flow chart logic commences following turning on an ignition switch (not shown) and control proceeds to a logic block at step S1 where the electronic control unit 10 and the electronic gasoline injection control unit 20 are initialized to clear data held in the previous control cycle. Subsequently, signals are input from the sensors 11–19 and 35 and the switch 40 to detect wheel speeds v1–v4, a vehicle speed V, a steering angle θH, a yaw rate ψact, lateral and longitudinal accelerations Y and Z, pedal pressure PB and a presence of a traction control stop signal S at step S2 and operations of vehicle state variables are made at step S3. After making correction of the wheel speeds v1–v4 based on the incoming signals at step S4, operations are subsequently made to obtain controlled variables necessary for execution of the stability control, the anti-lock braking control and the traction control based on the vehicle state variables at steps S5, S6 and S7, respectively. A judgement is made at step S8 to determine one of the controlled variables which is the greatest among them. Based on the determination, either one of the stability control, the anti-lock braking control and the traction control is executed at step S8, S9 or S10 based on the greatest controlled variable. Thereafter, a fail-safe decision is made at step S11 as to whether the hydraulic pressure control unit 30 and its associated elements are normal in operation. If there is any failure in connection with the hydraulic pressure control unit 30 and its associated elements, the flow chart logic discontinues control to which a broken-down element is related and orders return to step S1 for execution of another sequence routine.

FIGS. 3 through 7 show a flow chart of the sequence subroutine of operation of the coordinated stability control. When the flow chart logic commences and control proceeds to a logic block at step S101 where the electronic control unit 10 reads various actual measurements including wheel speeds v1–v4, a vehicle speed V, a steering angle θH, a yaw rate ψ and a lateral acceleration Y based on incoming signals from the sensors 11–18. A vertical load on the vehicle is estimated based on the vehicle speed V and lateral acceleration Y in a known mathematical operation at step S102. Operations are subsequently made at steps S103, S104 and S105 to find an actual vehicle slip angle β of the vehicle, a reference vehicle slip angle βref and an estimated vehicle slip angle βcont, respectively. The actual vehicle slip angle β is given by integrating a changing rate of actual slip angle Δβ which is given by the following equation (I);

$$\Delta\beta = -\psi + Y/V \tag{I}$$

The reference vehicle slip angle βref, which is used to estimate an estimated slip angle βcont necessary for the stability control, is calculated by using a two-degrees-of-freedom model based on dimensional specifications of the vehicle, vehicle state variables, which include a vehicle speed V, a yaw rate ψ, lateral acceleration Y, a changing rate of actual vehicle slip angle Δβ and a changing rate of actual yaw rate Δψ, an estimated yaw moment D1 generated by applying brakes and an estimated reduction in lateral force D2 generated by applying brakes. That is, the reference slip angle βref is a slip angle estimated based on braking force and the vehicle state variables. The estimated slip angle βcont is given by solving a differential equation derived from the following equations (II) and (III):

$$\Delta\beta\text{cont} = \Delta\beta + e + Cf \cdot (\beta\text{ref} - \beta\text{cont}) \tag{II}$$

$$\Delta e = Cf \cdot (\Delta\beta\text{ref} - \Delta\beta - e) \tag{III}$$

where e is an off-set correction factor for the yaw rate sensor and the lateral acceleration sensor and Cf is a cut-off frequency.

As will be described later, the cut-off frequency Cf, which is a factor for a speed correction for resetting an integral error produced in connection with the estimated slip angle βcont by correcting the estimated slip angle βcont according to the reliability of the reference vehicle slip angle βref so as to become the reference vehicle slip angle βref, becomes smaller with a decline in the reliability of the reference vehicle slip angle βref. A decline in the reliability of a reference vehicle slip angle βref occurs following a change in cornering force Cpf of the front wheels or a change in cornering force Cpr of the rear wheels.

In succession, a wheel slip rate and a wheel slip angle of each wheel are estimated based on the wheel speed v, the vehicle speed V, the estimated slip angle βcont and the steering angle θH in a known mathematical operation at step S106, and a load factor Kw of each wheel is estimated based on the vertical load, wheel slip rate and wheel slip angle of the wheel in a known mathematical manner at step S107. Based on the lateral acceleration Y and the load factors, a road surface friction coefficient μ is calculated at step S108. A target yaw rate ψTR and a target vehicle slip angle PTR are calculated at step S109. While the target yaw rate ψTR is estimated based on the vehicle speed V, the road surface friction coefficient μ and the steering angle θH in a known mathematical manner, the target vehicle slip angle βTR is given by solving a differential equation (VI) derived from the following equations (IV) and (V):

$$\beta x = 1/(1 + A \cdot V^2) \cdot \{1 - (M \cdot Lf \cdot V^2)/(2L \cdot Lr \cdot Cpr)\} \cdot Lr \cdot \theta H/L \tag{IV}$$

$$A = M \cdot (Cpr \cdot Lr - Cpf \cdot Lf)/2L^2 \cdot Cpr \cdot Cpf \tag{V}$$

$$\Delta\beta TR = C \cdot (\beta x - \beta TR) \tag{VI}$$

where V is the vehicle speed;

θH is the steering angle of front wheels;

M is the mass of a vehicle body;

I is the moment of inertia;

L is the wheel base of a vehicle;

Lf is the distance to the center of gravity of a vehicle from front wheels;

Lr is the distance to the center of gravity of a vehicle from rear wheels;

Cpf is the cornering force of a front wheel;

Cpr is the cornering force of a rear wheel; and

C is the value relating to a delay in phase.

Thereafter, the absolute value of the slip angle difference of the target vehicle slip angle βTR from the estimated slip angle βcont is compared with the threshold slip angle β0 for control commencement at step S110. When the absolute value of the slip angle difference βdif (=|βTR−βcont|) is greater than the threshold slip angle β0, the target slip angle βTR is taken as a target value in the stability control at step S111 and a vehicle slip angle βamt used in the stability control is subsequently calculated as the controlled variable at step S112. On the other hand, when the absolute value of the slip angle difference βdif is smaller than the threshold slip angle β0, the absolute value of a yaw rate difference of the target yaw rate ψTR from the actual yaw rate ψ(=|ψTR−ψ|) is compared with the threshold yaw rate ψ0 at step S113. When the absolute value of the yaw rate difference ψdif is greater than the threshold yaw rate ψ0, then a yaw rate ψTR is taken as a target value in the stability control at step S114 and a yaw rate ψamt used in the stability control is subsequently calculated as the controlled variable at step S115. However, when the absolute value of the yaw rate difference ψdif(=|ψTR−ψ|) is smaller than the threshold yaw rate ψ0, the flow chart logic orders return to step S101 to repeat the operation of controlled variables. Thereafter, a process for coordination between the stability control and the anti-lock braking control takes place through steps S116–S139. In the coordination process, even if conditions for commencement of the stability control are satisfied while the anti-lock braking control is under execution, the anti-lock braking control is continuously executed or the controlled variable for the stability control is corrected according to the controlled variable for the anti-lock braking control. Further, when conditions for commencement of both stability control and anti-lock braking control are satisfied, either control is executed according to the pedal pressure PB. Specifically, a detection is made as to a failure of the hydraulic pressure control unit 30 and elements associated with the stability control system at step S116. If there is a failure in the pressure control unit 30 and the elements, the stability control is discontinued at step S126 and the flow chart logic orders return to the main routine shown in FIG. 2 for another execution of the stability control. On the other hand, when there is nor failure, a decision is made at step S117 as to whether a stability control flag F1 is up or has been set to a state of "1" which indicates that the stability control is under execution. When the stability control flag F1 is down or has been reset to a state of "0" which indicates that the stability control is discontinued, then decisions are subsequently made at steps S118 and 119 as to whether the anti-lock braking control is under execution and whether the traction control is under execution, respectively. When both anti-lock braking control and traction control are discontinued or after discontinuing the traction control at step S120 when, while the anti-lock braking control is discontinued, the traction control is under execution, a slip angle controlled variable βamt or a yaw rate controlled variable ψamt used in the stability control is calculated based on a target wheel slip rate which the wheel selected to be braked bears at step S121. After calculating a controlled variable necessary for the engine 21 to provide a drop in output torque at step S122, the stability control is executed at step S123. After setting the stability control flag F1 to the state of "1" at step S124, the flow chart logic orders to the main routine shown in FIG. 2 for another execution of the stability control.

When the answer to the decision concerning the stability control flag F1 made at step S117 is affirmative, another decision is made at step S125 as to whether a anti-lock braking control flag F2 is up or has been set to a state of "1" which indicates that the anti-lock braking control is under execution. Subsequently, the flow chart logic takes steps S127–S132 when the anti-lock braking control flag F2 is up or steps S133–S139 when the anti-lock braking control flag F2 is down or has been reset to a state of "0" which indicates that the anti-lock braking control is under discontinuance. Specifically, when the flow chart logic proceeds to step S127, a controlled variable used in the anti-lock braking control is corrected according to either the slip angle controlled variable βamt or the yaw rate controlled variable ψamt. Subsequently, a decision is made at step S128 as to whether the anti-lock braking control is has terminated. Before termination of the anti-lock braking control, after resetting the stability control flag F1 and the anti-lock braking control flag F2 to their states of "1" at steps S129 and S130, respectively, the flow chart logic orders return to step S101 to repeat the operation of controlled variables. On the other hand, after termination of the anti-lock braking control, after resetting the stability control flag F1 and the anti-lock braking control flag F2 to their states of "0" at steps S131 and S132, respectively, the flow chart logic orders return to step S101 to repeat the operation of controlled variables. On the other hand, when the flow chart logic proceeds to step S133, the pedal pressure PB is compared with a threshold pressure Po for termination of the stability control. When the pedal pressure PB is higher than the threshold pressure Po, the stability control is disconnected at step S134, and the anti-lock braking control takes place of at step S135. After setting the anti-lock braking control flag F2 to the state of "1" at step S136, the flow chart logic orders return to step S101 to repeat the stability control. However, when the pedal pressure PB is lower than the threshold pressure Po, a decision is made at step S137 as to whether the stability control has terminated. When the stability control remains under execution, the flow chart logic orders return to step S121 to continue the stability control. However, when the stability control is discontinued, after resetting the stability control flag F1 and the anti-lock braking control flag F2 to their states of "0" at step S138 and S139, respectively, the flow chart logic orders return to step S101 to repeat the stability control. In the coordinated stability and anti-lock braking control sequence subroutine, the process after step S112 is referred to as vehicle slip angle control and the process after step S114 is referred to as yaw rate control.

Typically, temper spare tires are used in place of tires blown out. Such a temper spare tire is smaller approximately 5 to 15% in diameter than normal tires and provides a wheel speed greater than the normal tire. For this reason, the correction of wheel speeds is introduced to eliminate adverse effects of the variation in diameter between the temper spare tires and normal tires. These adverse effects include: an occurrence of the error that the normal tire tends to be judged in the anti-lock braking control to have a tendency toward lockup due to an increase in vehicle speed used in the stability control when one of the wheels of the vehicle is higher than others; an occurrence of the error that, in the event one of driving wheels which mounts the temper spare tire thereon, another driving wheel which mounts the normal tire thereon is judged to cause a spin; and the variation in vehicle speed due to a tolerance in diameter of the normal tires as great as 5%, which always affects the stability control.

Figure 8:
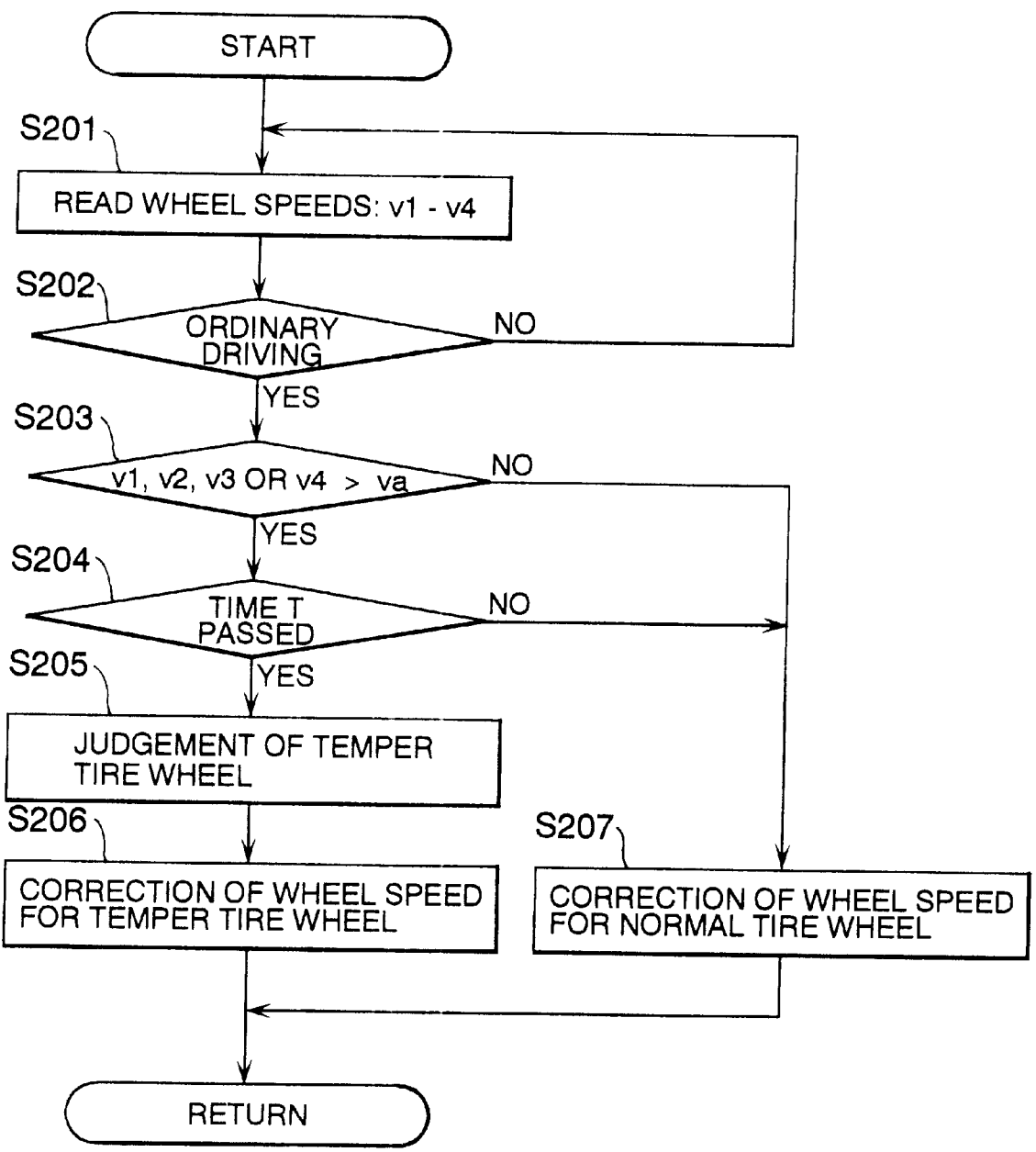
FIG. 8 is a flow chart illustrating a sequence routine of wheel speed correction.

FIG. 8 shows a flow chart of the sequence subroutine of the wheel speed correction executed in the flow chart at step S4 shown in FIG. 2. When the flow chart logic commences and control proceeds to a logic block at step S201 where the incoming signals from the wheel speed sensors 11–14 are read to detect wheel speeds v1–v4 of the respective wheels. In succession, decisions are made at steps S202, S203 and S204 as to whether the vehicle is under ordinary running, whether either one of the wheel speeds v1–v4 is greater than a threshold wheel speed vα for execution of the wheel speed correction, and whether a specified period of time T has passed, respectively. In this instance, the term "ordinary running" refers to running or cruising without acceleration or deceleration which provides aggravation of the reliability wheel speed and to running or cruising straight. The wheel speeds v1–v4 are repeatedly detected until the vehicle turns to the ordinary running. When, while the vehicle is ordinarily running, either one of the wheel speeds v1–v4 is greater than a threshold wheel speed vα and the specified period of time T has passed, only the wheel whose wheel speed is higher the threshold wheel speed vα is judged to be of the temper spare tire at step S205 and the wheel speed of the wheel mounting the temper spare tire (spare tire mounted wheel) is corrected at step S206. On the other hand, when all four wheel speeds are lower than the threshold wheel speed vα or when it is before passage of the specified period of time T even if one or more wheel speeds are higher than the threshold wheel speed vα, the wheel speeds of the wheels mounting normal tires thereon (normal tire mounted wheels) are corrected at step S207. After the correction of wheel speeds, the flow chart logic orders return to the main routine.

Figure 9:
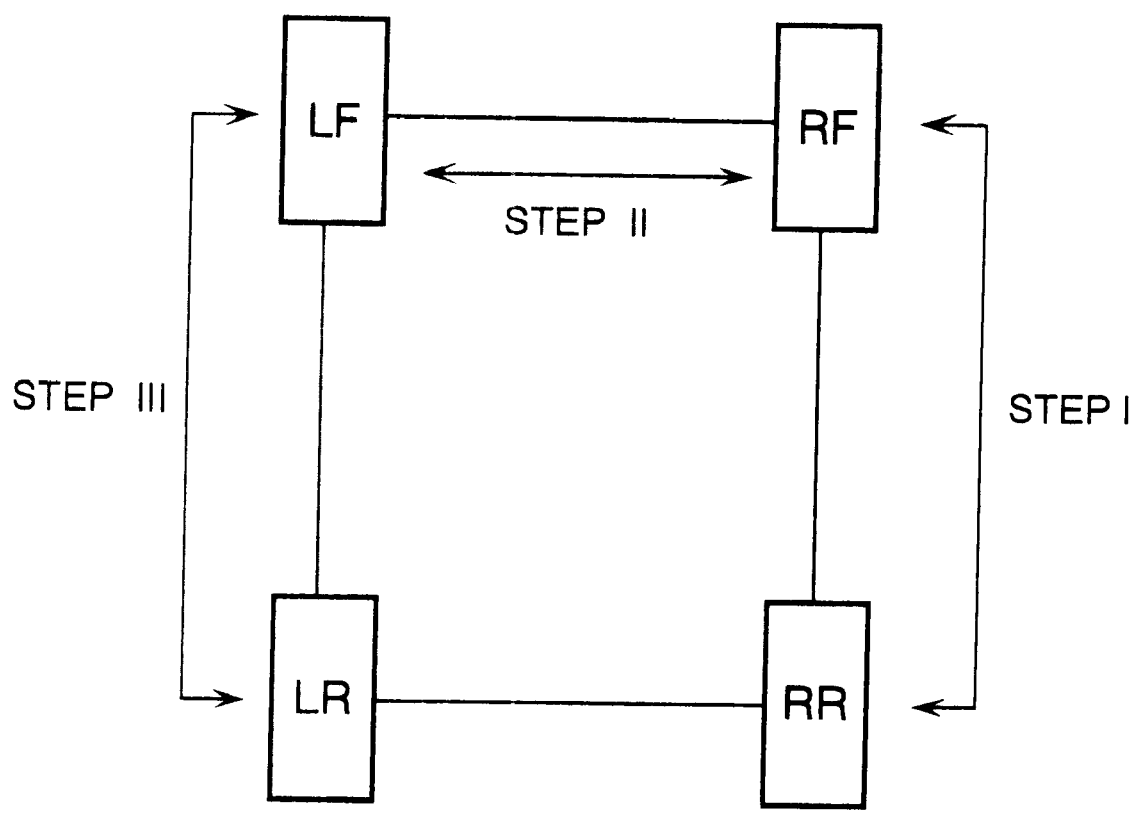
FIG. 9 is a block diagram illustrating a sequence routine of wheel speed correction.

The wheel speed correction is performed in a process as shown in block diagram in FIG. 9. The wheel speed correction process includes three steps, namely a step (I) of correcting the right rear wheel speed based on the right front wheel speed, a step (II) of correcting the left front wheel speed based on the right front wheel speed and a step (III) of correcting the left rear wheel speed based on the left front wheel speed, for example, in this order. In this instance, if the right front wheel mounts the temper spare tire thereon, another wheel speed is employed as a basic wheel speed.

Figure 10:
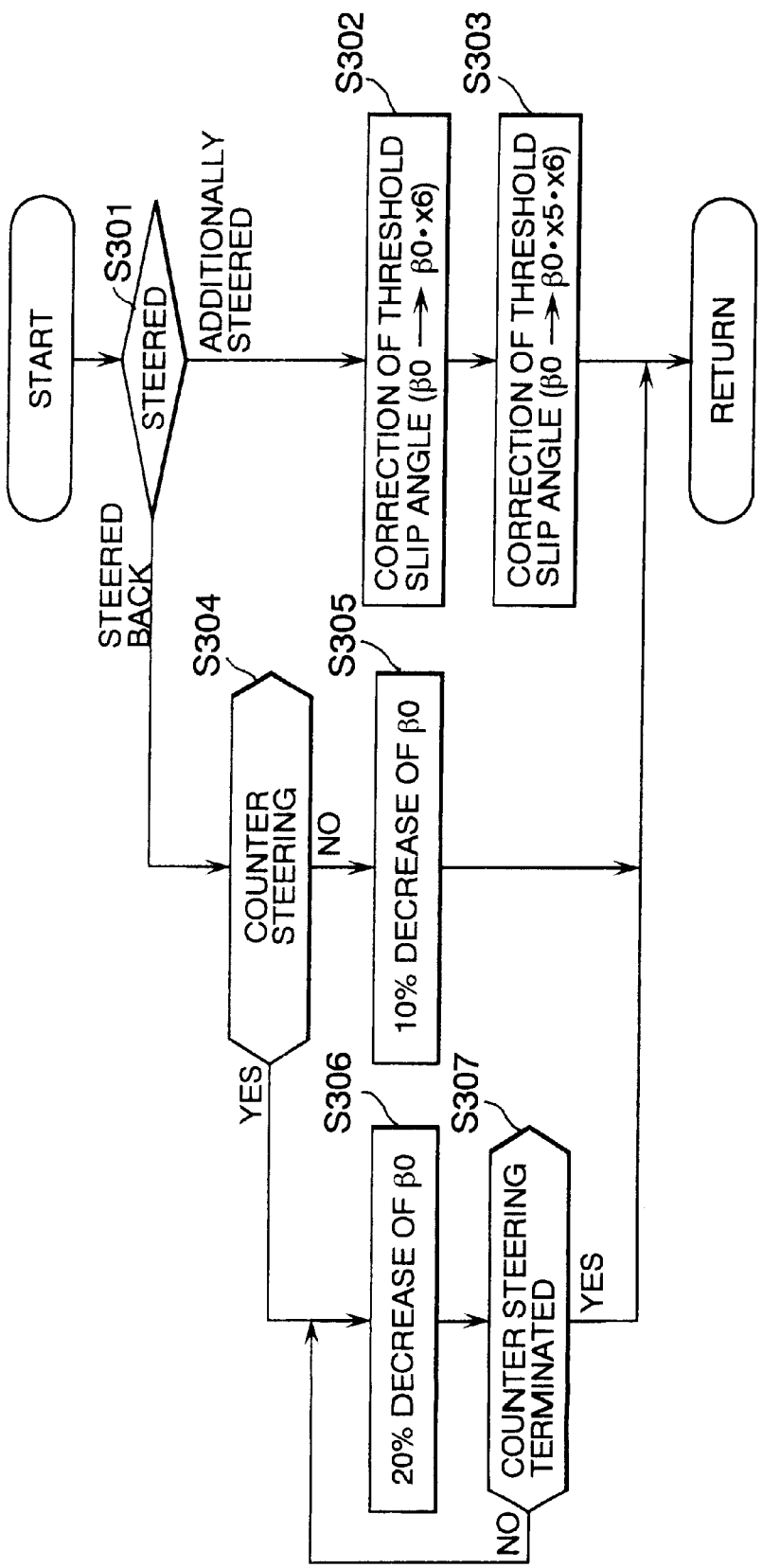
FIG. 10 is a flow chart illustrating a sequence routine of correction of a threshold slip angle for commencement of the slip angle control.

FIG. 10 is a flow chart of the sequence routine of correction of the threshold slip angle β0 for commencement of vehicle slip control in the stability control. While the vehicle slip angle β gradually increases during the yaw rate control through the process after step S112 in the coordinated stability and anti-lock braking control sequence subroutine shown in FIGS. 4–7, when the absolute value of the slip angle difference βdif becomes greater than the threshold slip angle β0, control shifts to the vehicle slip control. Upon the shift to the vehicle slip control, if the vehicle encounters a large slip angle as a result of the yaw rate control, the estimated slip angle βcont, i.e. the direction of the vehicle, is significantly different from the target vehicle slip angle βTR. Accordingly, rectification of the vehicle attitude is rapidly caused as a result of execution of the vehicle slip angle control. That is, since the vehicle shows a tendency to rectify its running direction against driver's steering operation, while the vehicle slip control is exceedingly effective if the vehicle is under the necessity of rectifying its running direction, nevertheless, the vehicle slip control affects driver's steering operation made without the intention of rectifying running direction of the vehicle. Grounded on the fact explained in brief, the correction of the threshold slip angle β0 for commencement of the vehicle slip control is executed in order to cause a smooth shift to the vehicle slip angle control from the yaw rate control a little earlier in response to driver's steering operation.

Figure 11:
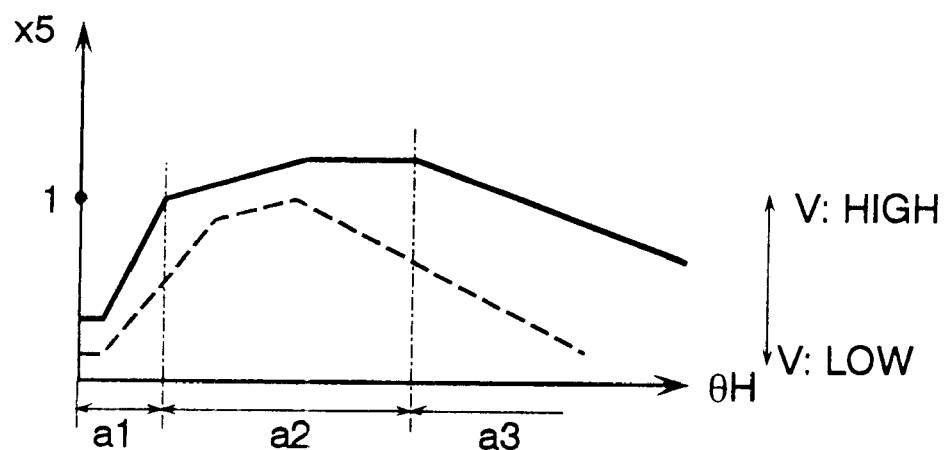
FIG. 11 is a map of threshold slip angle correction factor with respect to a changing rate of steering angle.

As shown in FIG. 10, when the flow chart logic commences and control proceeds to a logic block at step S301 where a decision is made based on an incoming steering signal from the steering angle sensor 16 as to a state of steering. When there is an increase in steering angle θH or an increase in the changing rate of steering angle ΔθH, it is decided that the vehicle is additionally steered. On the other hand, when there is a decrease in steering angle θH after the vehicle is additionally steered or a reversal of a changing rate of steering angle ΔθH, it is decided that the vehicle is steered back. An additional increase in steering is regarded as being made immediately before entering a corner or on the first half of a corner. Under an additional increase in steering, the threshold slip angle β0 is corrected with a threshold slip angle correction factor ×5 specified relatively to a steering angle θH by a map shown in FIG. 11 by way of example at step S302 and is subsequently corrected with a threshold slip angle correction factor ×6 specified relatively to a changing rate of steering angle ΔθH by a map shown in FIG. 12 by way of example at step S303. The threshold slip angle correction factor map shown in FIG. 11 defines the correction factor ×5 varying at different gradients according to zones of steering angles θH. Specifically, since it is desirable for the vehicle to retrieve a right direction in a zone a1 of smaller steering angles θH where the vehicle is regarded as running straight ahead and, however, steered abruptly to dodge an obstruction or as having a flat tire, or is at the beginning of cornering, the threshold slip angle β0 takes a minus value and is sharply decreased with a decrease in steering angle θH so as to make the slip control through steps S110 and S111 shown in FIG. 4 harder to take place. In a zone a2 of moderate steering angles θH where the vehicle is regarded as cornering in a normal state and the vehicle is preferred to turn a corner not under the vehicle slip control but under the yaw rate control, the threshold slip angle β0 is gradually increased above a value of 1 (one) with an increase in steering angles θH so as to make the vehicle slip control harder to take place. Further, since, in a zone a3 of larger steering angles θH where the vehicle is regarded as causing serious slippage and running straight although the vehicle is steered to turn on, for example, a snow covered road, it is desirable for the vehicle to retrieve a right direction, the threshold slip angle β0 is gradually decreased with an increase in steering angles θH so as to make the vehicle slip control easier to take place. The threshold slip angle β0 may be decreased so as to make the vehicle slip control easier to take place with an increase in vehicle speed V as shown by a chained line in FIG. 11. The threshold slip angle correction factor map shown in FIG. 12 defines the correction factor ×6 which varies greater as the steering angle changing rate ΔθH becomes higher. Upon an occurrence of an increase in the steering angle changing rate ΔθH which is regarded as reflecting the driver's intention of rapidly steering the vehicle to turn a corner, the threshold slip angle 130 is increased so as to make the vehicle slip control harder to take place. As a result of which, the vehicle is prevented from rectifying its running direction against a steering action by the driver.

On the other hand, when the vehicle is steered back, which is regarded as, for example, going to pass through a corner or being on the later half of a corner, a judgement is made at step S304 as to whether the vehicle is steered back as a result of a counter steering operation by the driver. This judgement is made based on whether the direction of steering is opposite to the direction in which a yaw moment or a yawing motion is caused. When the steering direction and the yawing direction are identical, this indicates that counter steering operation is not made, then, the threshold slip angle β0 is changed by a decrement of 10% at step S305 so as to get ready for a sudden occurrence of a lateral slip. However, when the steering direction and the yawing direction are opposite, this indicates that counter steering is made and that the vehicle is unstable in running direction, then, the threshold slip angle β0 is changed by a decrement of 20% at step S306 so as to make it possible to rectify the vehicle in running direction. The 20% reduction in the threshold slip angle β0 is repeated until the counter steering is over at step S307. In this instance, the threshold slip angle which is reduced 10% at step S305 or 20% at step S306 may be one (β0·×5) after correction at step S302 or one (β0·×5·×6) after correction at step S303.

Figure 12:
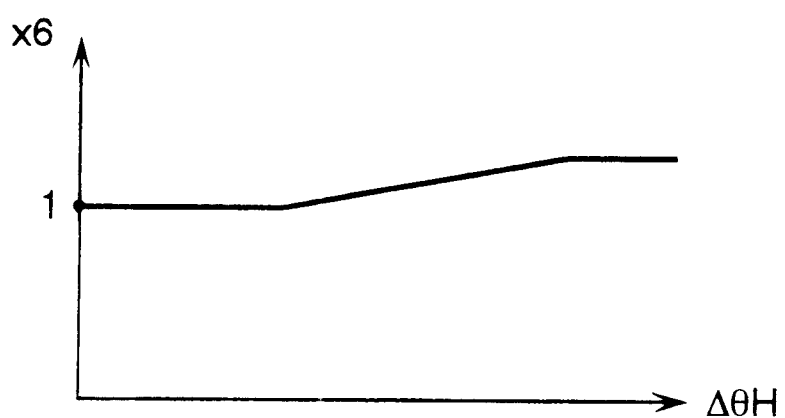
FIG. 12 is a map of threshold slip angle correction factor with respect to a changing rate of steering angle.
Figure 13:
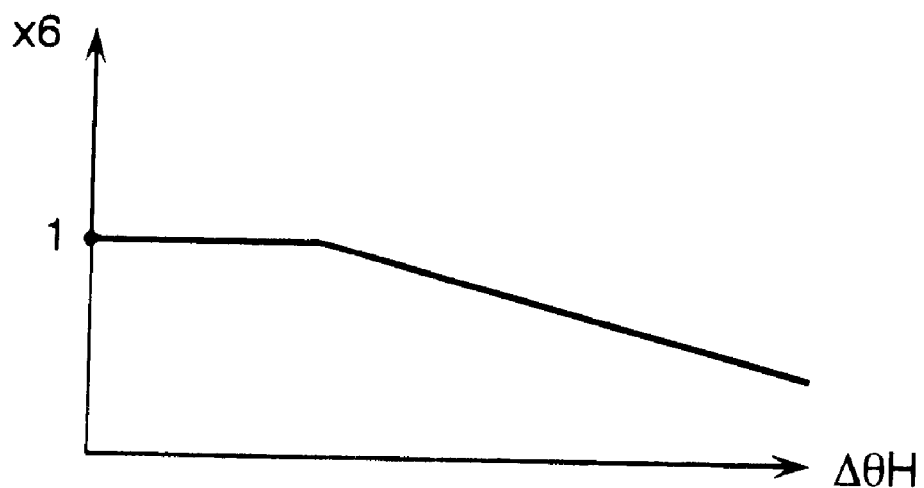
FIG. 13 is another map of threshold slip angle correction factor with respect to a changing rate steering angle.
Figure 14:
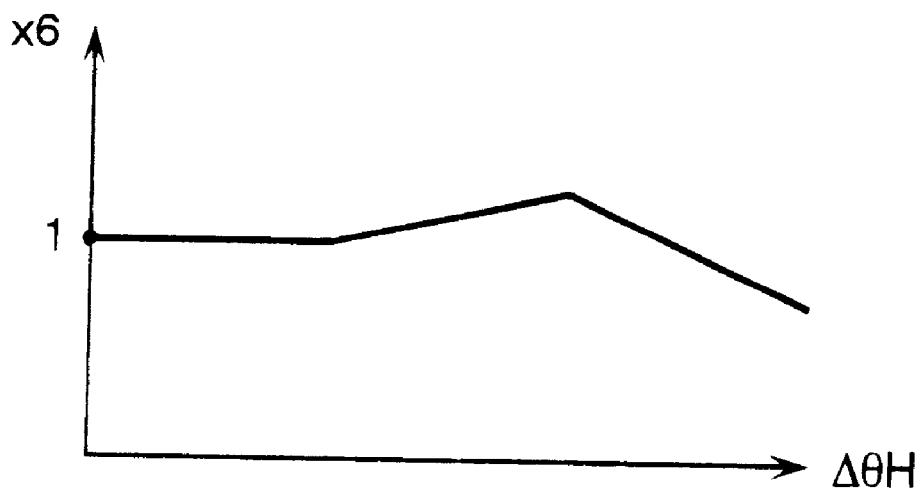
FIG. 14 is another map of threshold slip angle correction factor with respect to a changing rate of steering angle.

The threshold slip angle correction factor map shown in FIG. 13 or shown in FIG. 14 may be used in substitution of the threshold slip angle correction factor map shown in FIG. 12. The map shown in FIG. 13 or 14 defines a correction factor ×6 which varies smaller as the steering angle changing rate ΔθH becomes higher so as to make the slip control easier to take place. This is because, in the event where the steering angle changing rate ΔθH is high, in other words, where the vehicle is sharply steered in order to dodge an obstruction or upon an occurrence of a flat tire, it is desired for the vehicle to rectify the right direction.

The vehicle possibly experiences undesirable effects after an occurrence of a spin such that the stability control possibly takes place against the driver's intention due to an enhanced integral error of an estimated slip angle βcont in consequence of an increased yaw rate caused as a result of an occurrence of a spin. For this reason, it may be carried out to increase the threshold slip angle β0 upon an occurrence of a spin which is detected as a sharp increase in yaw rate so as to make the slip control harder to take place. The same is true for a correction of the threshold slip angle β0 upon an occurrence of a drift which is detected as a slip angle significantly large relative to a steering angle. The threshold slip angle β0 may be increased for a road whose road surface friction coefficient sharply changes so as to make the slip control harder to take place in the case where the road surface friction coefficient of a road on which the vehicle is running sharply changes. This is because an integral error of an estimated slip angle βcont becomes larger due to a change in road surface friction coefficient and, as a result of which, the vehicle is possibly controlled against the driver's intention of rectifying the vehicle direction. The threshold slip angle β0 may be also increased so as to make the slip control harder to take place for the reason that an estimated slip angle βcont becomes inaccurate due to a significantly small value of road surface friction coefficient resulting from that the detection of a lateral load becomes harder as the duration of straight running in which the steering angle θH changes little becomes long.

Figure 15:
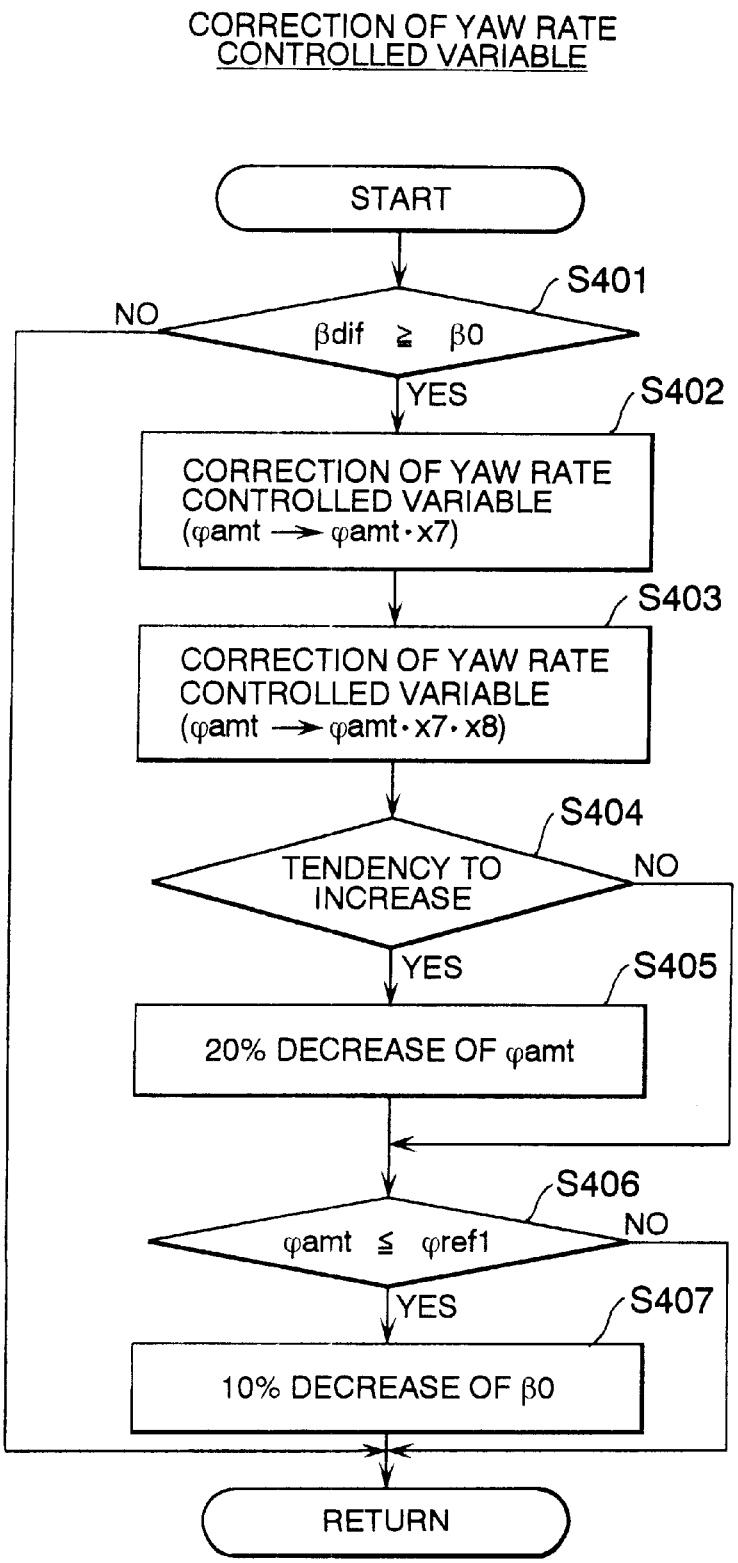
FIG. 15 is a flow chart illustrating a sequence routine of correction of a yaw rate controlled variable.

FIG. 15 is a flow chart of the sequence routine of correction of the yaw rate controlled variable ψamt used in the stability control. The yaw rate controlled variable correction is carried out based on what the threshold slip angle correction is aimed at. That is, the yaw rate controlled variable ψamt is decreased according to the slip angle difference βdif so as to make attainment of a target yaw rate ψTR slow, thereby switching smoothly the control from the yaw rate control to the slip angle control without causing a significant change in running direction of the vehicle.

As shown in FIG. 15, when the flow chart logic commences and control proceeds directly to a logic block at step S401 where a judgement is made as to whether driving conditions are within a yaw rate zone, i.e. whether, while the absolute value of the slip angle difference βdif is less than the threshold slip angle β0, the absolute value of the yaw rate difference ψdif is greater than the threshold yaw rate ψ0. When the driving conditions are within the yaw rate control zone, the yaw rate controlled variable ψamt is corrected with a yaw rate variable correction factor ×7 specified relatively to a slip angle difference βdif by a map shown in FIG. 16 by way of example at step S402 and is subsequently corrected with a yaw rate controlled variable correction factor ×8 specified relatively to a changing rate of a slip angle difference Δβdif(=|βdif(n)−βdif(n−1)|) by a map shown in FIG. 17 by way of example at step S403.

Thereafter, a judgement is made at step S404 as to whether the slip angle difference βdif has a tendency to increase. When there is a tendency for the slip angle difference βdif to increase, the control is regarded as being immediately before switching to the slip angle control, then, the yaw rate controlled variable ψamt by a decrement of 20% at step S405 so as to delay attaining the target yaw rate ψTR. After changing the yaw rate controlled variable ψamt by a decrement of 20% at step S405 when there is a tendency for the slip angle difference βdif to increase or without changing the yaw rate controlled variable ψamt when there is no tendency for the slip angle difference βdif to increase, a judgement is made at step S406 as to whether the yaw rate controlled variable ψamt is equal to or less than a reference rate ψref1. When the yaw rate controlled variable ψamt is equal to or less than the reference rate ψref1, the threshold slip angle β0 is changed by a decrement of 10% at step S407 so as to make the slip angle control easier to take place. After changing the threshold slip angle β0 by a decrement of 10% at step S407 when the yaw rate controlled variable ψamt is equal to or less than the reference rate ψref1 or without changing the threshold slip angle β0 when the yaw rate controlled variable ψamt is greater than the reference rate ψref1, the flow chart logic orders return. In the event where the yaw rate controlled variable ψamt is further decreased, the reference rate ψref1 is set to a value such as to make attainment of the target yaw rate ψTR slow and, as a result, to keep the yaw rate control from instantly effecting on the vehicle direction.

Figure 16:
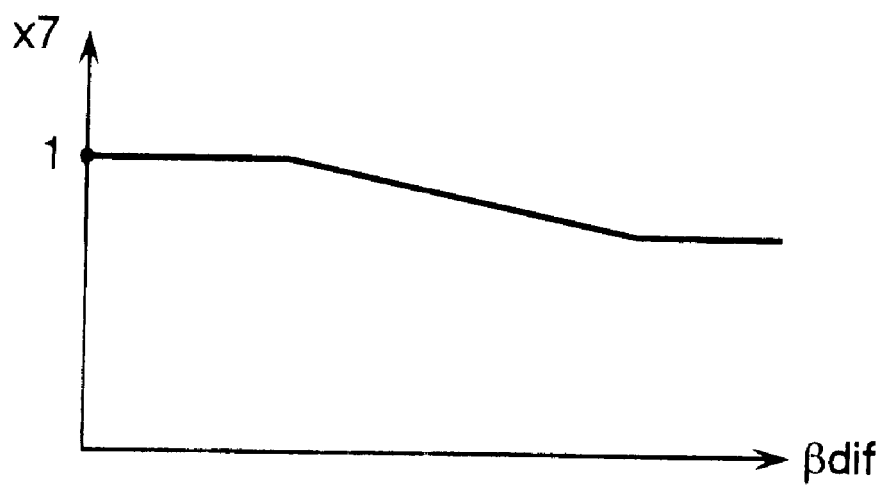
FIG. 16 is a map of yaw rate controlled variable relative to a difference of slip angle.
Figure 17:
FIG. 17 is a map of yaw rate controlled variable relative to a changing rate of slip angle difference.

As shown in FIG. 16, since an increase in slip angle difference βdif indicates that the vehicle is in a direction significantly different with respect to the target yaw rate ψTR although it is under driving conditions out of the yaw rate control zone, the yaw rate controlled variable correction factor ×7 is decreased as the slip angle difference βdif increases so as to attain the target yaw rate ψTR slowly, as a preliminary process to a shift to the slip angle control, without immoderately controlling the vehicle direction with the yaw rate. Further, as shown in FIG. 17, since an increase in slip angle difference changing rate Δβdif indicates that the vehicle starts to get out of its course with respect to the target yaw rate ψTR although under driving conditions out of the yaw rate control zone, the yaw rate controlled variable correction factor ×8 is decreased as the slip angle difference changing rate Δβdif increases so as to attain the target yaw rate ψTR slowly, as a preliminary process to a shift to the slip angle control, without immoderately controlling the vehicle direction with the yaw rate.

Figure 18:
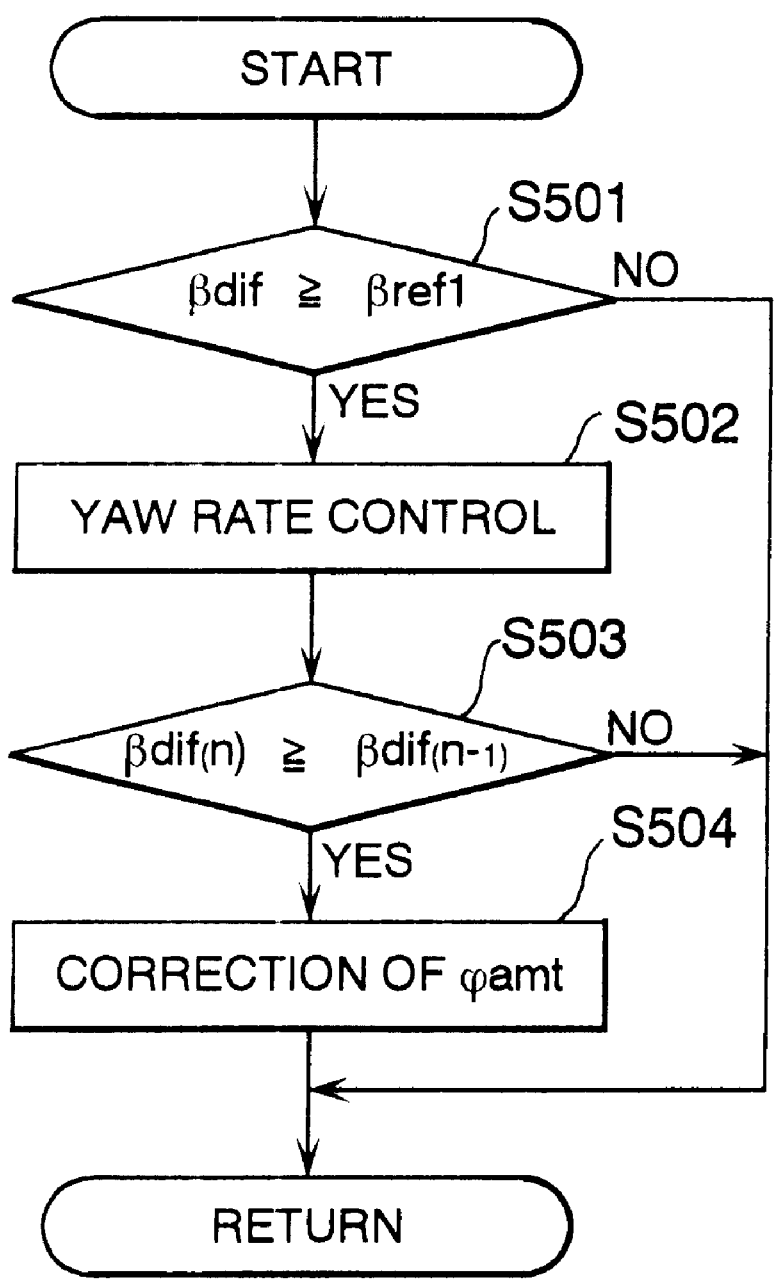
FIG. 18 is another flow chart illustrating a sequence routine of correction of a yaw rate controlled variable.

FIG. 18 is a flow chart of a variation of the sequence routine of correction of the yaw rate controlled variable ψamt shown in FIG. 15. In the sequence routine of correction of the yaw rate controlled variable ψamt, the yaw rate controlled variable ψamt is corrected when there is a tendency for the slip angle difference βdif to increase and, however, the yaw rate control is executed without correcting the yaw rate controlled variable ψamt when the slip angle difference βdif shows no increase.

Referring to FIG. 18, when the flow chart logic commences and control proceeds directly to a logic block at step S501 where the slip angle difference βdif is compared with a reference angle βref1 which is greater than the threshold slip angle β0. When the slip angle difference βdif is greater than the reference angle βref1, the yaw rate control is executed at step S502. Thereafter, the slip angle difference βdif is compared with a slip angle difference βdif−1 detected during the preceding cycle at step S503. When the slip angle difference βdif is equal to or greater than the preceding slip angle difference βdif−1, this indicates that the slip angle difference βdif has a tendency to increase, then, the yaw rate controlled variable ψamt is corrected with a yaw rate variable correction factor ×7 specified relatively to the slip angle difference βdif by a map shown in FIG. 16 at step S504. On the other hand, when the slip angle difference βdif is less than the reference angle βref1 and when it is less than the preceding slip angle difference βdif−1, the yaw rate controlled variable correction sequence routine returns to the coordinated control shown in FIGS. 3 through 7.

Figure 19:
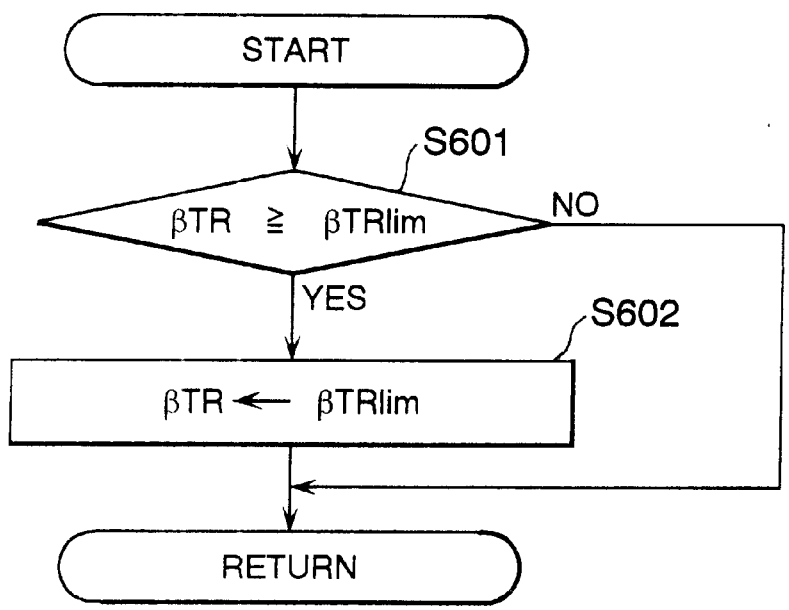
FIG. 19 is a flow chart illustrating a sequence routine of establishing an upper limit for a target slip angle.

FIG. 19 is a flow chart illustrating the sequence subroutine of setting an upper limit βTRlim for the target slip angle βTR. When the vehicle encounters a spin or a drift during execution of the slip angle control, the driver will be flurried and possibly tries to steer the vehicle unusually too much while the vehicle is still running at a high speed. In such a case where the vehicle is steered through a large angle, the target slip angle βTR becomes greatly off from a normal target slip angle, which always undesirable for the reliability. If the slip angle control is executed under such a condition, the estimated slip angle βcont reaches an unreliable target slip angle βTR, so that the vehicle is rectified differently from the right direction. In view of the above solicitude, the target slip angle upper limit βTRlim is set according to the reliability of the target slip angle βTR which depends upon a vehicle speed V and a steering angle θH. Specifically, a target slip angle upper limit βTRlim is used and lowered when the reliability of a target slip angle βTR is low so as to prevent overcontrol toward the target slip angle βTR.

As shown in FIG. 19, when the flow chart logic commences and control proceeds directly to a logic block at step S601 where the target slip angle βTR is compared with a target slip angle upper limit βTRlim which is determined according to either one of a vehicle speed V, a steering angle θH and a steering angle changing rate ΔθH as shown in FIGS. 20 through 25 by way of example.

Figure 20:
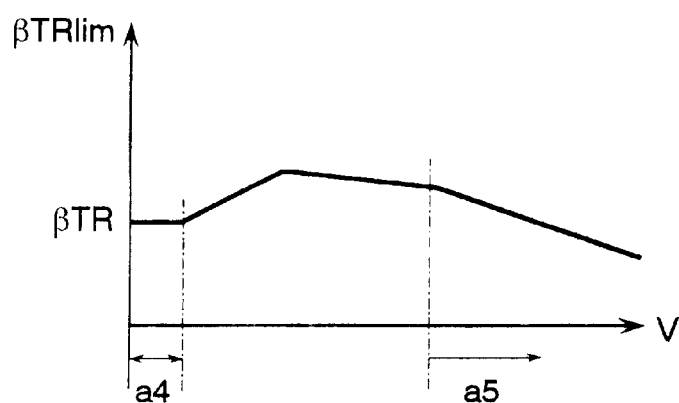
FIG. 20 is a map of the upper limit of a target slip angle relative to a vehicle speed.

The target slip angle upper limit βTRlim may be defined by a map shown in FIG. 20. As shown, the target slip angle upper limit βTRlim is lowered in a zone a4 of lower vehicle speeds V where the driver possibly steers the vehicle too much in confusion upon an occurrence of, for example, a spin during driving on a snow covered road and, as a result, the slip angle difference βdif increases in a wrong direction, so as to restrain a change in running direction of the vehicle. Further, since there is a long time to spare in the lower speed zone a4 even though the target slip angle upper limit βTRlim is low, the vehicle is easily rectified in running direction by repeating the control. On the other hand, the slip angle controlled variable βamt becomes larger in a zone as of higher vehicle speeds V because the slip angle difference βdif becomes larger as compared with a steering angle in the higher vehicle speed zone a4 than in a zone of lower vehicle speeds V. If the stability control is executed with a large slip angle controlled variable βamt during running at a high speed, the wheels loose gripping force due to sharp stability control, possibly causing the vehicle to spin. For avoiding an occurrence of a spin in such a case, the target slip angle upper limit βTRlim is lowered with an increase in vehicle speed so as to prevent or significantly reduce unusual changes in running actions of the vehicle due to execution of the slip angle control.

Figure 21:
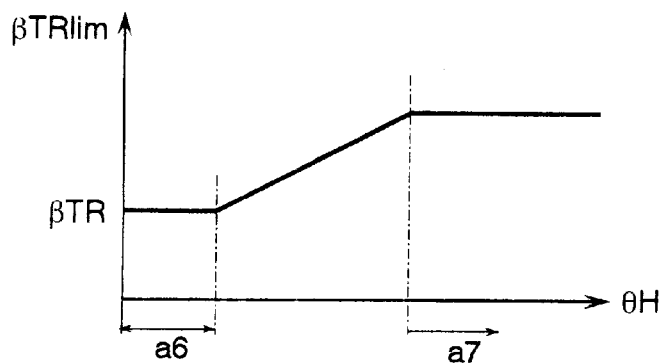
FIG. 21 is a map of the upper limit of a target slip angle relative to a steering angle.
Figure 22:
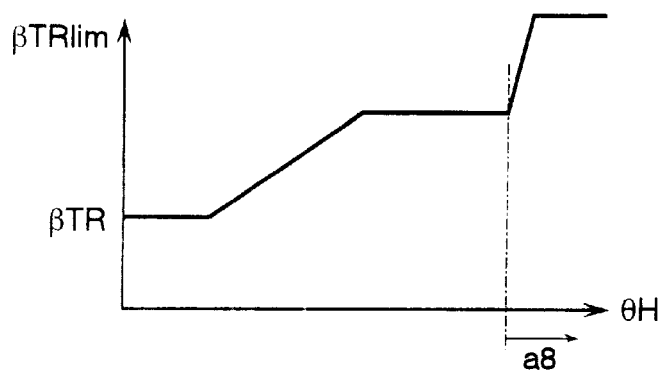
FIG. 22 is another map of the upper limit of a target slip angle relative to a steering angle.
Figure 23:
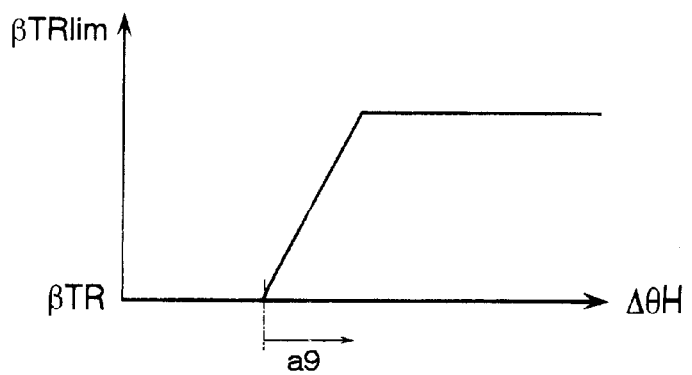
FIG. 23 is another map of the upper limit of a target slip angle relative to a changing rate of steering angle.

Otherwise, the target slip angle upper limit PTRlim may be defined by a map shown in FIG. 21. The slip angle difference βdif increases as the steering angle θH becomes larger, leading to an easy occurrence of a spin of the vehicle. The target slip angle upper limit βTRlim is raised with an increase in steering angle θH so as to rectify the vehicle direction. Specifically, as shown, since the vehicle possibly spins or drifts out of the course consequently in a zone a7 of larger steering angles θH where the slip angle difference βdif is encouraged as compared with a zone a6 of smaller steering angles θH, the target slip angle upper limit βTRlim is raised higher with an increase in steering angle θH from the smaller steering angle zone a6 to the larger steering angle zone a7 so as to execute that the slip angle control as soon as possible to attain the target slip angle for early rectification of the vehicle running direction. A map shown in FIG. 22 defines the target slip angle upper limit βTRlim for a zone a8 of extremely larger steering angles θH which occur as, for example, a result that the driver steers the vehicle in a desired direction after counter steering. In the extremely larger steering angle zone a8, the target slip angle upper limit βTRlim is further raised so as to execute that the slip angle control as soon as possible to attain the target slip angle for early rectification of the vehicle direction. In place of a steering angles θH, a steering angle changing rate ΔθH may be employed to define the target slip angle upper limit βTRlim by a map shown in FIG. 23. In a zone a9 of larger steering angle changing rate ΔθH which occur as, for example, a result that the driver steers the vehicle in a desired direction after counter steering, the target slip angle upper limit βTRlim is further raised so as to execute that the slip angle control as soon as possible to attain the target slip angle for rectification of the vehicle direction intended by the driver.

Figure 24:
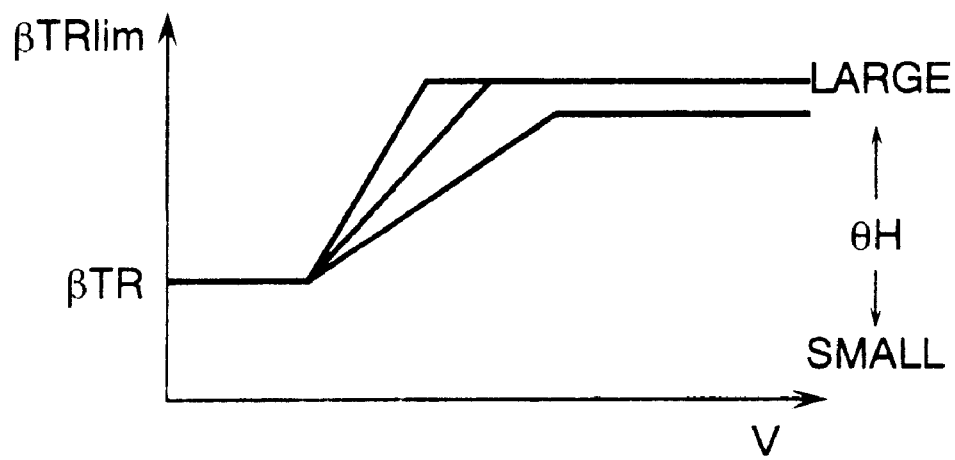
FIG. 24 is a map of the upper limit of a target slip angle relative to a vehicle speed and a steering angle.
Figure 25:
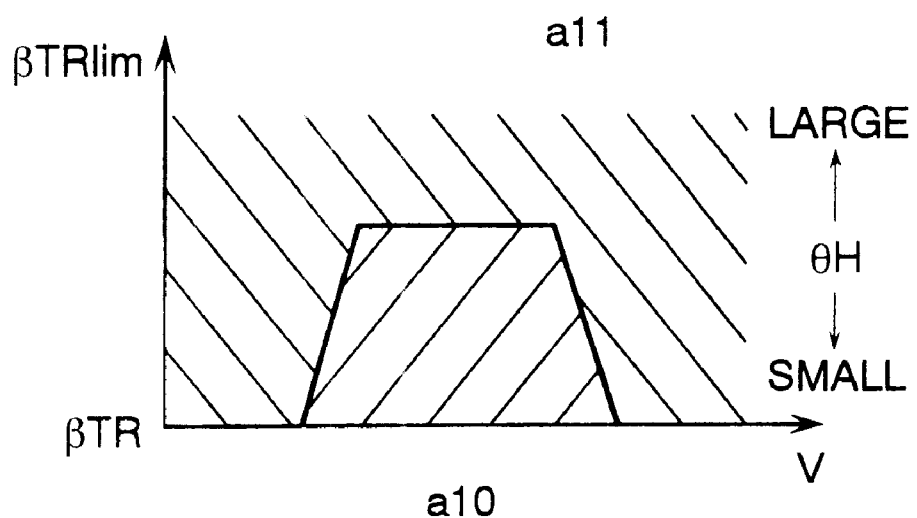
FIG. 25 is a map of the upper limit of a target slip angle relative to a vehicle speed and a changing rate of steering angle.

The target slip angle upper limit βTRlim may be defined with respect to both vehicle speed V and steering angle θH by a map shown in FIG. 24. Since the slip angle difference βdif becomes larger with an increase in steering angle θH even though the vehicle speed V is high, the target slip angle upper limit βTRlim is raised so as to execute that the slip angle control as soon as possible to attain the target slip angle for rectification of the vehicle direction intended by the driver. The target slip angle upper limit βTRlim may otherwise be defined by a map shown in FIG. 25. Since, in a zone a10 of moderate vehicle speeds V and moderate steering angles θH, the target slip angle βTR is provided with a high reliability, the target slip angle upper limit βTRlim is raised higher in the moderate zone a10. However, in a zone a11, out of the moderate zone a10, where target slip angle βTR is provided with a poor reliability, the target slip angle βTR remains unchanged.

In the cases where the vehicle runs on a road whose surface friction coefficient is less than a predetermined level and the vehicle is easily steered, the slip angle difference βdif is apt to increase. In such a case, the target slip angle upper limit βTRlim may be lowered so as to prevent or significantly reduce unusual changes in running actions of the vehicle due to execution of the slip angle control.

Figure 26:
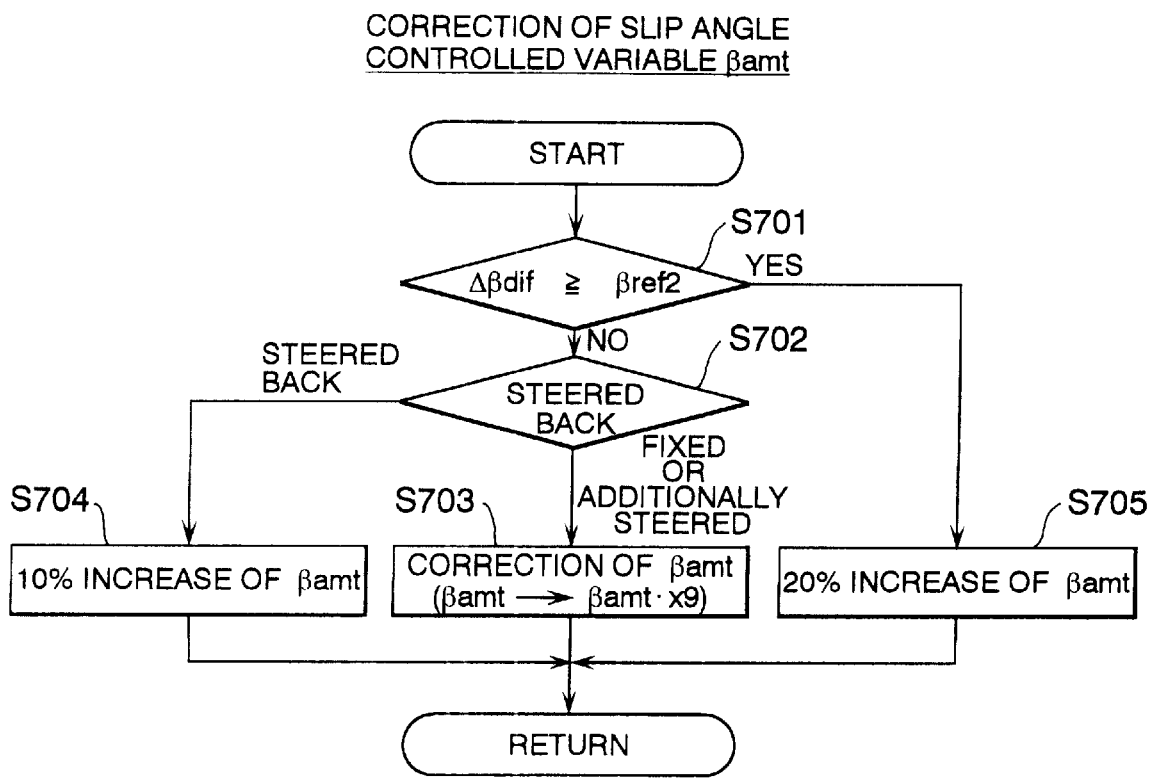
FIG. 26 is a flow chart illustrating a sequence routine of correction of a slip angle controlled variable.
Figure 27:
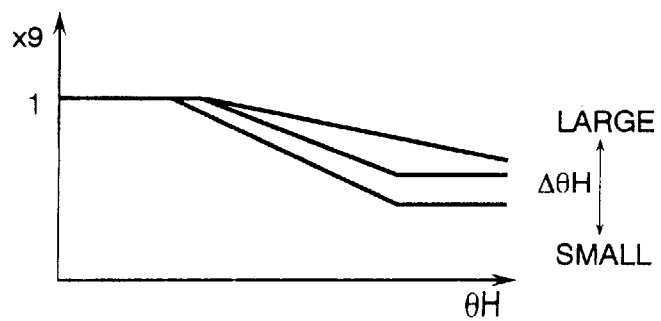
FIG. 27 is a map of the slip angle controlled variable relative to a steering angle and a changing rate of steering angle.

FIG. 26 is a flow chart illustrating the sequence subroutine of correction of the slip angle controlled variable βamt. During execution of the slip angle control, a change in slip angle difference changing rate Δβdif occurs due possibly to an increase in target slip angle βTR. Although the target slip angle βTR is determined depending upon steering the vehicle by the driver, if the vehicle is additionally steered under a condition in which the slip angle difference βdif increases, the vehicle results in encountering a spin or a drift of the course. In order to avoid the result, the slip angle controlled variable βamt is corrected according to whether the vehicle is additionally steered or steered back, or otherwise according to a steering angle θH or a steering angle changing rate ΔθH so as to execute the slip angle control meeting the driver's steering operation. As shown in FIG. 26, when the flow chart logic commences and control proceeds directly to a logic block at step S701 where a slip angle difference changing rate Δβdif is compared with a reference angle βref2. When the slip angle difference changing rate Δβdif is equal to or greater than the reference angle βref2, the slip angle controlled variable βamt is changed by an increment of 20% at step S705 so as to attain the target slip angle βTR for early rectification of the vehicle direction. On the other hand, when the slip angle difference changing rate Δβdif is less than the reference angle βref2, this indicates that there is not under the necessity of rectifying the vehicle direction, then a judgement is made based, for instance, a steering angle θH or a steering angle changing rate ΔθH at step S702 as to whether the vehicle is steered back. The vehicle is regarded as being fixed in running direction when there is no change in steering angle θH or steering angle changing rate ΔθH, as being additionally steered when there is an increase in steering angle θH or steering angle changing rate ΔθH, or as being steered back when there is a decrease in steering θH or steering angle changing rate ΔθH. Fixing the vehicle in running direction or to additionally steering the vehicle in a event where the vehicle is going to spin or drift out of the course and the slip angle control intervenes results in encouragement of the spin or the drift and is considered to be a wrong steering operation. For this reason, when the vehicle is regarded as being fixed in running direction or being additionally steered, the slip angle controlled variable βamt is considered to have a lower reliability and is corrected with a slip angle controlled variable correction factor ×9 specified relatively to steering angle θH and steering angle changing rate ΔθH by a map shown in FIG. 27 at step S703. On the other hand, steering back the vehicle in a event where the vehicle is going to spin or drift out of the course and the slip angle control intervenes results in evasion of the spin or the drift and is considered to be a right counter steering operation. Accordingly, when the vehicle is regarded as being steered back, the slip angle controlled variable βamt is considered to have a higher reliability and is changed by an increment of 10% at step S704 so as to attain the target slip angle βTR for early rectification of the vehicle direction. Fixing the vehicle in running direction or additionally steering the vehicle while the vehicle is going to spin or drift out of the course encourages a spin or a drift and is consequently regarded as being a wrong steering operation. In such a case, since the target slip angle βTR is considered to have a lower reliability and causes a sharp change in running actions of the vehicle, the slip angle controlled variable correction factor ×9 is decreased as the steering angle θH and/or the steering angle changing rate ΔθH become larger as shown in FIG. 27.

Figure 28:
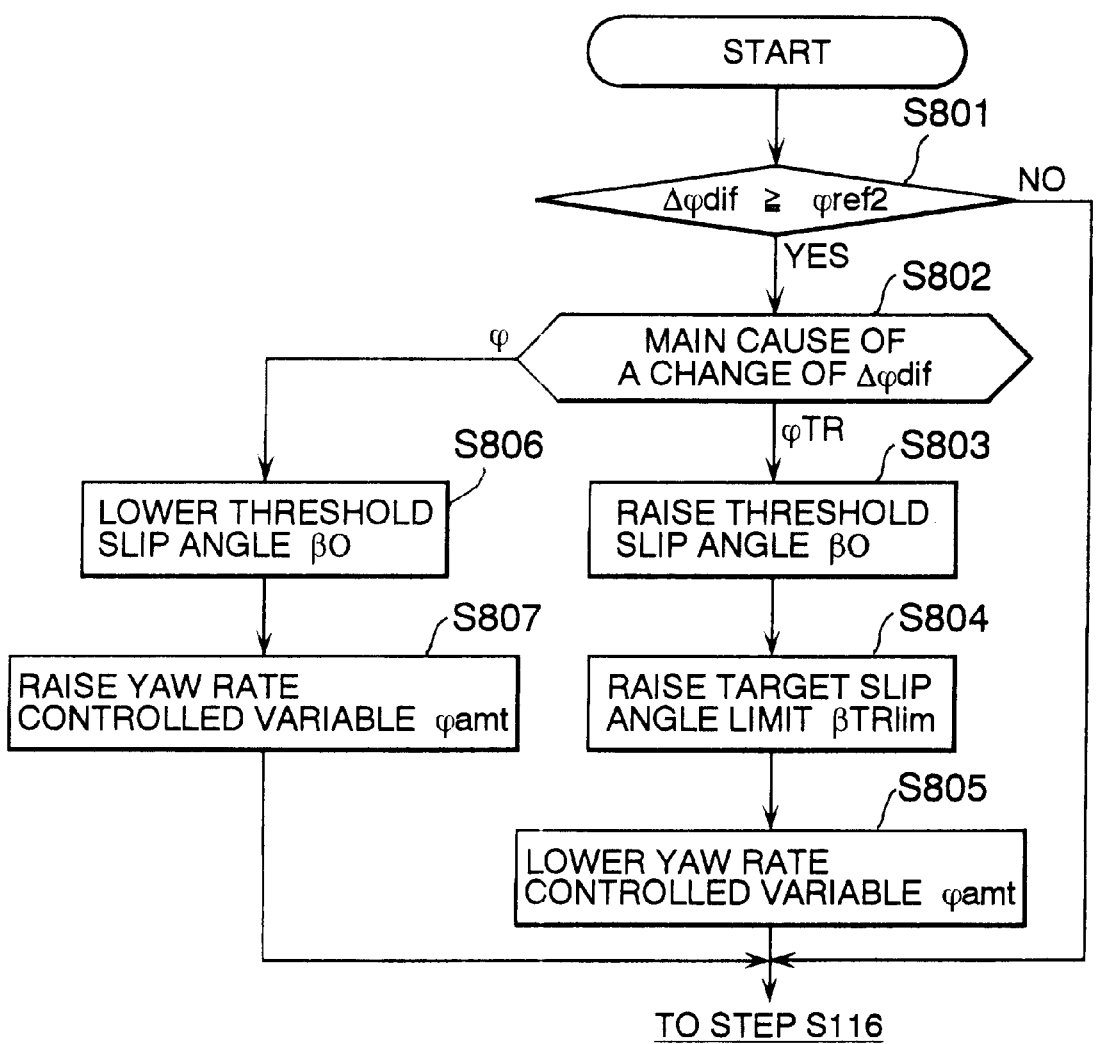
FIG. 28 is a flow chart illustrating a sequence routine of correction of a threshold slip angle for commencement of the slip angle control, a target slip angle and a yaw rate controlled variable based on a yaw rate difference.

FIG. 28 is a flow chart illustrating the sequence routine of correction of the yaw rate controlled variable βamt according to main causes of a change in yaw rate difference ψdif which is executed at step S115 of the coordinated control shown in FIGS. 3 through 7. Specifically, when there is a change in yaw rate difference changing rate Δψdif in excess of a reference rate ψref2, the yaw rate controlled variable ψamt is differently corrected according to which change is the main cause of the change in yaw rate difference changing rate Δψdif, a change in target yaw rate ψTR or a change in actual yaw rate ψ.

As shown in FIG. 28, after setting the target yaw rate ψTR at step S114 of the coordinated control shown in FIGS. 3 through 7, the yaw rate difference changing rate Δψdif is compared with the reference rate ψref2 at step S801. When the yaw rate difference changing rate Δψdif is equal to or greater than the reference rate ψref2, a judgement is made at step S802 as to whether the main cause of a change in yaw rate difference changing rate Δψdif is a change in target yaw rate ψTR or a change in actual yaw rate ψ. This judgement is made based a difference between changes in target yaw rate and actual yaw rate or a difference between changes in target slip angle and actual slip angle as will be described later. It is regarded as being a result from steering the vehicle by the driver that the yaw rate difference changing rate Δψdif in excess of the reference rate ψref2 is caused due to a change in actual yaw rate ψTR, and it is regarded as being a result from disturbances such as changes in road surface appearance and/or road surface friction coefficient that the yaw rate difference changing rate Δψdif in excess of the reference rate ψref2 is caused due to a change in actual yaw rate ψ. When the main cause of the change in yaw rate difference changing rate Δψdif in excess of the reference rate ψref2 is a change in target yaw rate ψTR, the threshold slip angle β0 is raised to make the slip angle control harder to take place so as to meet the driver's intention to steer the vehicle at step S803, and the target slip angle upper limit βTRlim is subsequently raised so as to allow the target slip angle βTR to increase according to a change in steering angle while the slip angle control takes place at step S804. Thereafter, the yaw rate controlled variable ψamt is made smaller to restrain the yaw rate control to prevent or significantly reduce a sharp change in running direction of the vehicle at step S805, so that the stability control is executed without interference with the driver's steering operation so as to meet the driver's intention to steer the vehicle.

When the main cause of the change in yaw rate difference changing rate Δψdif in excess of the reference rate ψref2 is a change in actual yaw rate ψ, there is the necessity of rectifying the vehicle direction, then, at step S806, the threshold slip angle β0 is lowered to make the slip angle control easier to take place so as to get ready early for coping with a slip or a drift possibly occurring during execution of the slip angle control and, subsequently at step S807, the yaw rate controlled variable ψamt is made larger to cause rapid attainment of the target yaw rate ψTR so as to rectify the vehicle direction quickly.

Figure 29:
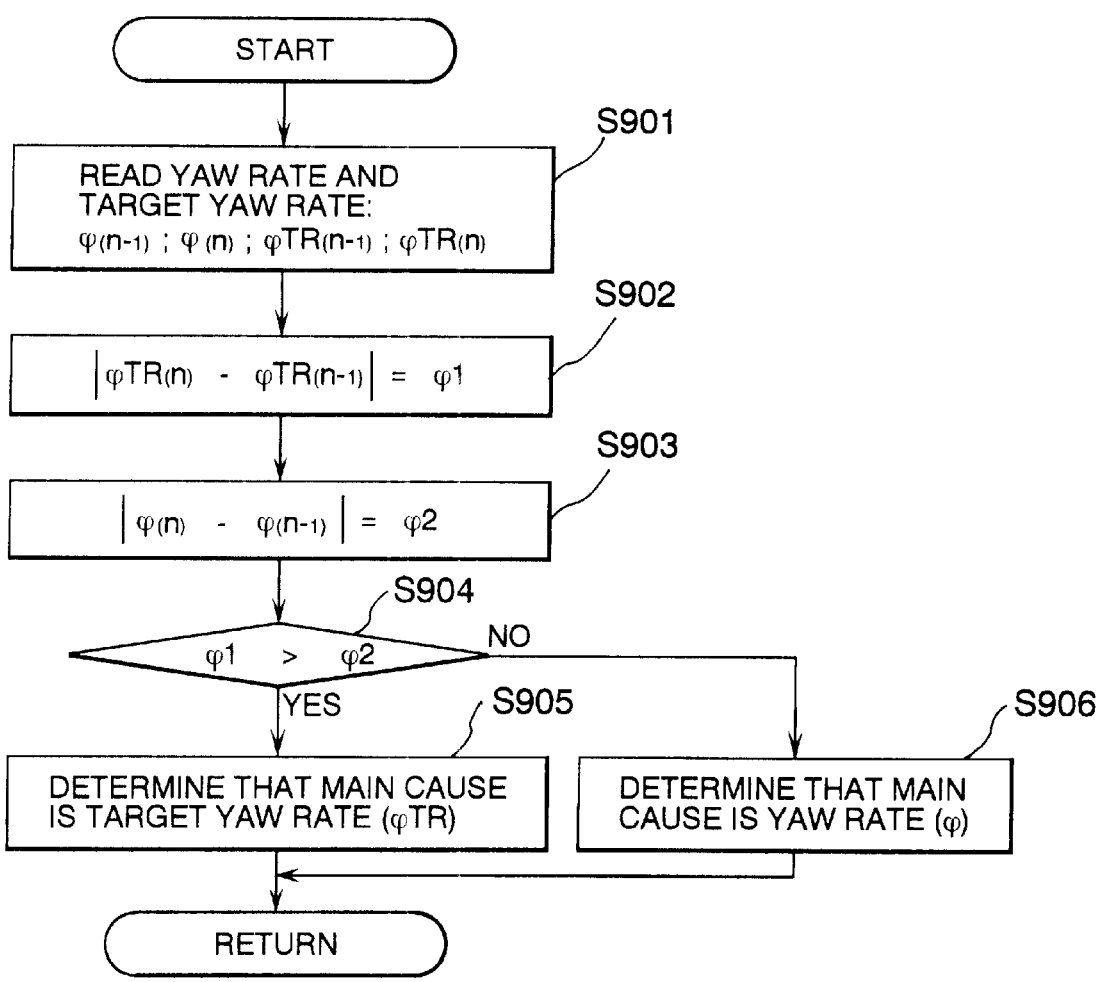
FIG. 29 is a flow chart illustrating a sequence routine of a judgement as to a main cause of a change in yaw rate difference changing rate.

FIG. 29 is a flow chart illustrating a sequence routine of the judgement as to the main cause of a change in yaw rate difference changing rate Δψdif. In the flow chart logic, after reading the present and previous yaw rates ψ(n) and ψ(n−1) and the present and previous target yaw rates ψTR(n) and ψTR(n−1) at step S901, the absolute change of target yaw rate ψ1 of the present target yaw rate ψTR(n) from the previous target yaw rate ψTR(n−1) is calculated at step S902 and the absolute change of yaw rate ψ2 of the present yaw rate ψ(n) from the previous yaw rate ψ(n−1) is calculated at step S903. Subsequently, a comparison is made between these absolute target yaw rate change ψ1 and absolute yaw rate change ψ2 at step S904. The change in yaw rate difference changing rate Δψdif is judged to have occurred due to the change in target yaw rate ψTR at step S905 when the absolute target yaw rate change ψ1 is greater than the absolute yaw rate change ψ2 or due to the change in yaw rate ψ at step S906 when the absolute target yaw rate change ψ1 is equal to or less than the absolute yaw rate change ψ2.

Figure 30:
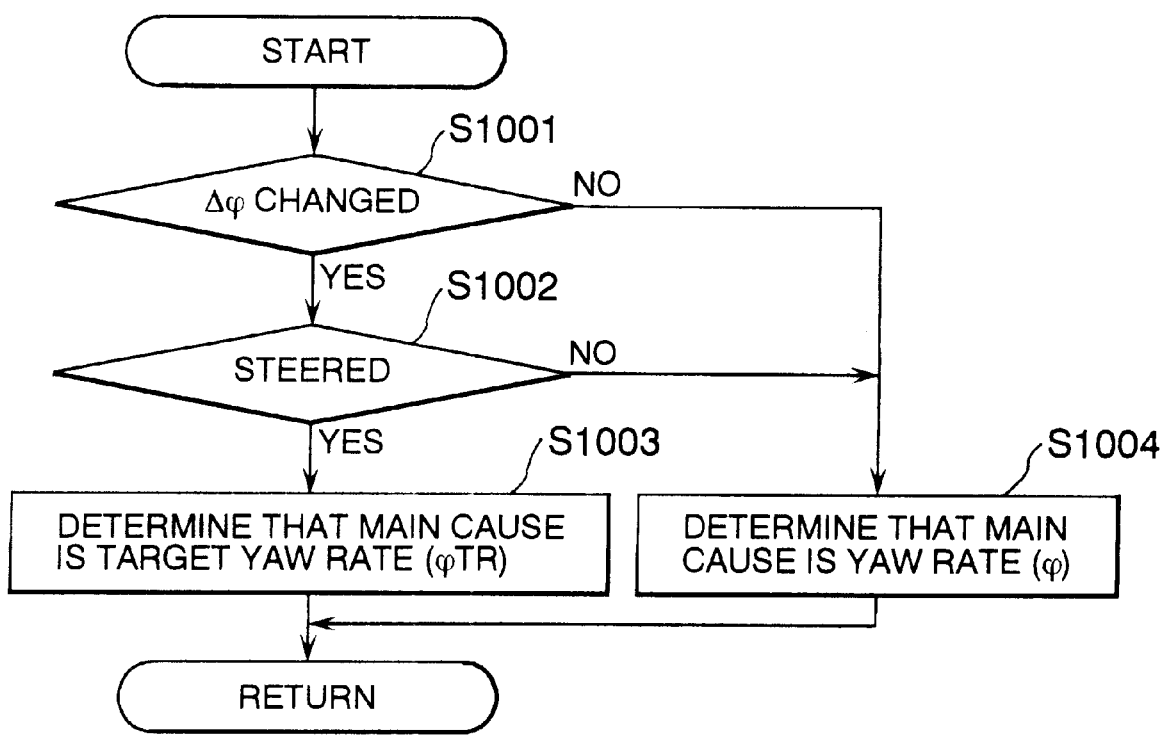
FIG. 30 is a flow chart illustrating another sequence routine of the judgement as to a main cause of a change in yaw rate difference changing rate.

FIG. 30 shows another sequence routine of the judgement as to the main cause of a change in yaw rate difference changing rate Δψdif. The main cause of a change in yaw rate difference changing rate Δψdif is judged based on whether the vehicle is steered or not, i.e. whether there is a change in steering angle θH or steering angle changing rate ΔθH. As shown, the flow chart logic commences and, when there is a change in yaw rate difference changing rate Δψdif as a result of a judgement at step S1001, control proceeds to a logic block at step S1002 where a judgement is made as to whether the vehicle is steered. The change in yaw rate difference changing rate Δψdif is judged to have occurred due to a change in target yaw rate ψTR at step S1003 when the vehicle has been steered or due to a change in actual yaw rate ψ at step S1004 when the vehicle has not been steered.

Figure 31:
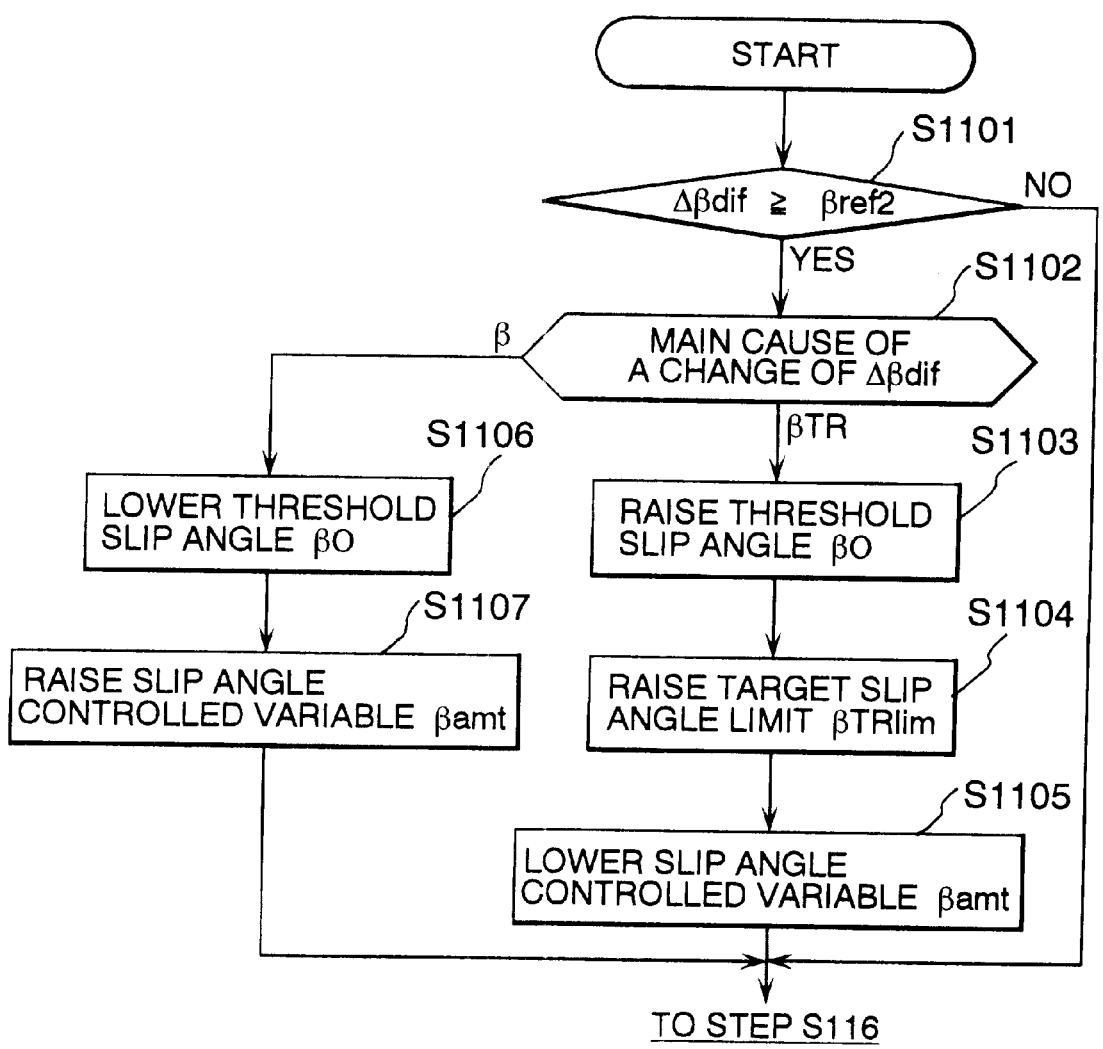
FIG. 31 is a flow chart illustrating a sequence routine of corrections for the threshold slip angle for commencement of the slip angle control, a target slip angle and a slip angle controlled variable based on a slip angle difference.

FIG. 31 is a flow chart illustrating the sequence routine of correction of the slip angle controlled variable βamt according to main causes of a change in slip angle difference βdif which is executed at step S112 of the coordinated control shown in FIGS. 3 through 7. Specifically, when there is a change in slip angle difference changing rate Δβdif(=|βdif(n)−βdif(n−1)|) in excess of a reference rate βref2, the slip angle controlled variable βamt is differently corrected according to which change is the main cause of the change slip angle controlled variable βamt, i e. a change in target slip angle βTR or a change in estimated slip angle βcont.

As shown in FIG. 31, after setting the target slip angle βTR at step S112 of the coordinated control shown in FIGS.

3 through 7, the slip angle difference changing rate Δβdif is compared with the reference rate βref2 at step S1101. When the slip angle difference changing rate Δβdif is equal to or greater than the reference rate βref2, a judgement is made at step S1102 as to whether the main cause of a change in slip angle difference changing rate Δβdif is a change in target slip angle βTR or a change in estimated slip angle βcont. This judgement is made based a difference between changes in target slip angle and estimated slip angle and following the sequence routine similar to the flow chart shown in FIG. 29 with replacement of the yaw rates ψ and ψTR with an estimated slip angle βcont and a target slip angle βTR, respectively. It is regarded as being a result from steering the vehicle by the driver that the slip angle difference changing rate Δβdif in excess of the reference rate βref2 is caused due to a change in target slip angle βTR, and it is regarded as being a result from disturbances such as changes in road surface appearance and/or road surface friction coefficient that the slip angle difference changing rate Δβdif in excess of the reference rate βref2 is caused due to a change in estimated slip angle βcont.

When the main cause of the change in slip angle difference changing rate βdif in excess of the reference rate βref2 is a change in target yaw rate ψTR, after raising the threshold slip angle β0 to make the slip angle control harder to take place so as to meet the driver's intention to steer the vehicle at step S1103, and subsequently raising the target slip angle upper limit βTRlim so as to allow the target slip angle βTR to increase according to a change in steering angle while the slip angle control takes place at step S1104, the slip angle controlled variable βamt is made smaller to restrain the slip angle control to prevent or significantly reduce a sharp change in running direction of the vehicle at step S1105, so that the stability control is executed without interference with the driver's steering operation so as to meet the driver's intention to steer the vehicle. On the other hand, when the main cause of the change in slip angle difference changing rate Δβdif in excess of the reference rate βref2 is a change in estimated slip angle βcont, there is the necessity of rectifying the vehicle direction as soon as possible, then, at step S1106, the threshold slip angle β0 is lowered to make the slip angle control easier to take place so as to get ready early for coping with a slip or a drift possibly occurring during execution of the slip angle control and, subsequently at step S1107, the slip angle controlled variable β is made larger to cause rapid attainment of the target yaw rate ψTR so as to rectify the vehicle direction quickly.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A stability control system for a vehicle for controlling braking force that is applied independently to respective front and rear wheels to control a slip and a spin of said vehicle, said stability control system comprising:

state variable detecting means for detecting running state variables including a yaw rate of said vehicle;

parameter determining means for determining an estimated slip angle of a slip occurring in said vehicle, a target yaw rate of said vehicle and a target slip angle of said vehicle on the basis of said running state variables;

yaw rate controlling means for controlling said braking force so as thereby to bring said yaw rate into said target yaw rate when a yaw rate difference between said yaw rate and said target yaw rate exceeds a threshold yaw rate for starting braking control based on yaw rate;

slip angle controlling means for controlling said braking force so as thereby to bring said estimated slip angle into said target slip angle when a slip angel difference between said estimated slip angle and said target slip angle exceeds a threshold slip angle for starting braking control based on slip angle; and changing means for, when said yaw rate difference exceeds said threshold yaw rate, judging which is a main cause, due to which said yaw rate difference exceeds said threshold yaw rate, between a change in said yaw rate and a change in said target yaw rate and changing at least one of said threshold slip angle and said braking force applied through said braking control based on yaw rate according to said main cause.

2. The stability control system as defined in claim 1, wherein said changing means said threshold slip angle so as to make it harder to start said braking control based on slip angle when said main cause is said change in said target yaw rate than when said main cause is said change in said yaw rate.

3. The stability control system as defined in claim 1, wherein said changing means changes said threshold slip angle so as to make it easier to start said braking control based on slip angle when said main cause is said change in said yaw rate than when said main cause is said change n said target yaw rate.

4. The stability control system as defined in claim 1, wherein said parameter determining means further determines an upper limit of said target slip angle and said changing means changes said upper limit of said target slip angle greater when said main cause is said change in said target yaw rate than when said main cause is said change in said yaw rate.

5. The stability control system as defined in claim 1, wherein said parameter determining means further determines an upper limit of said target slip angle and said changing means changes an upper limit of said target slip angle smaller when said main cause is said change in said yaw rate than when said main cause is said change in said target yaw rate.

6. The stability control system as defined in claim 1, wherein said changing means changes said braking force applied through said braking control based on yaw rate smaller when said main cause is said change in said target yaw rate than when said main cause is said change in said yaw rate.

7. The stability control system as defined in claim 1, wherein said changing means changes said braking force applied through said braking control based on yaw rate grater when said main cause is said change in said yaw rate than when said main cause is said change in said target yaw rate.

8. The stability control system as defined in claim 1, wherein said changing means changes at least one of said threshold slip angle and said braking force applied through said braking control based on yaw rate according to said main causes when a change rate of said yaw rate difference is greater than a specified change rate.

9. A stability control system for a vehicle for controlling braking force that is applied independently to respective from and rear wheels to control a slip and a spin of said vehicle, said stability control system comprising:

state variable detecting means for detecting running state variables including a yaw rate of said vehicle;

parameter determining means for determining an estimated slip angle of a slip occurring in said vehicle, a target yaw rate of said vehicle and a target slip angle of said vehicle on the basis of said running state variables;

slip angle controlling means for controlling said braking force so as thereby to bring said estimated slip angle into said target slip angle when a slip angle difference between said estimated slip angle and said target slip angle exceeds a threshold slip angle for starting braking control; and changing means for, when a change rate of a yaw rate difference between said yaw rate and said target yaw rate exceeds a specified change rate, judging which is a main cause, due to which said change rate of said yaw rate difference exceeds said specified change rate, between said yaw rate and said target yaw rate exceeds a predetermined rate between a change in said yaw rate and a change in said target yaw rate and changing said threshold slip angle according to said main cause.

10. The stability control system as defined in claim 9, wherein said changing means changes said threshold slip angle so as to make it harder to start said braking control based on slip angle when said main cause is said change in said target yaw rate than when said main cause is said change in said yaw rate.

11. The stability control system as defined in claim 9, wherein said changing means changes said threshold slip angle so as to make it easier to start said braking control based on slip angle when said main cause is said change in said yaw rate than when said main cause is said change in said target yaw rate.

12. The stability control system as defined in claim 9, wherein said parameter determining means further determines an upper limit of said target slip angle and said changing means changes said upper limit of said target slip angle greater when said main cause is said change in said target yaw rate than when said main cause is said change in said yaw rate.

13. A stability control system for a vehicle for controlling braking force that is applied independently to respective front and rear wheels to control a slip and a spin of said vehicle, said stability control system comprising:

state variable detecting means for detecting running state variables of said vehicle;

parameters determining means for determining an estimated slip angle of a slip occurring in said vehicle and a target slip angle of said vehicle on the basis of said running state variables;

slip angle controlling means for controlling said braking force so as thereby to bring said estimated slip angle into said target slip angle when a slip angle difference between said estimated slip angle and said target slip angle exceeds a threshold slip angle for starting braking control; and changing means for, when a change rate of said slip angle difference exceeds a specified change rate, judging which is a main cause, due to which said change rate of said slip angle difference exceeds said specified change rate, between a change in said estimated slip angle and a change in said target slip angle and changing at least one of said threshold slip angle and said braking force applied through said braking control according to said main cause.

14. The stability control system as defined in claim 13, wherein said changing means changes said threshold slip angle so as to make it harder to start said braking control when said main cause is said change in said target slip angle than when said main cause is said change in said estimated slip angle.

15. The stability control system as defined in claim 13, wherein said changing means changes said threshold slip angle so as to make it easier to start said braking control when said main cause is said change in said estimated slip angle than when said main cause is said change in said target slip angle.

16. The stability control system as defined in claim 13, wherein said parameter determining means further determines an upper limit of said target slip angle and said changing means changes said upper limit of said target slip angle greater when said main cause is said change in said target slip angle than when said main cause is said change in said estimated slip angle.

17. The stability control system as defined in claim 13, wherein said parameters determining means further determines an upper limit of said target slip angle and said changing means changes an upper limit of said target slip angle smaller when said main cause is said change in said estimated slip angle than when said main cause is said change in said target slip angle.

18. The stability control system as defined in claim 13, wherein said changing means changes said braking force applied through said braking control smaller when said main cause is said change in said target slip angle than when said main cause is said change in said estimated slip angle.

19. The stability control system as defined in claim 13, wherein said changing means changes said braking force applied through said braking control based on yaw rate greater when said main cause is said change in said estimated slip angle than when said main cause is said change in said target slip angle.

20. A system of driving stability control for a vehicle when controls braking force applied independently to respective front and rear wheels to control a slip and a spin of said vehicle, said system of driving stability control comprising:

a master cylinder operative to generate hydraulic pressure according to operations of a brake pedal of said vehicle;

a pressure intensifier operative to intensify said hydraulic pressure;

a hydraulic pressure control unit operative to distribute said hydraulic pressure to brake units for front and rear, right and left wheels, respectively;

a speed sensor operative to detect a running speed of said vehicle;

a yaw rate sensor operative to detect a yaw rate of said vehicle;

a lateral acceleration sensor operative to detect a lateral acceleration of said vehicle;

a braking force control unit operative to control said hydraulic pressure control unit on the basis of said running speed, said yaw rate and said lateral acceleration so as to control said braking force applied to each said wheel;

wherein said braking force control unit determines an estimated slip angle of a slip occurring in said vehicle, a target yaw rate of said vehicle and a target slip angle of said vehicle on the basis of said running speed, said yaw rate and said lateral acceleration, controls said hydraulic pressure control unit so as to bring said yaw rate into said target yaw rate when a yaw rate difference between said yaw rate and said target yaw rate exceeds a threshold yaw rate for starting braking control based on yaw rate, controls said hydraulic pressure control unit so as to bring said estimated slip angle into said target slip angle when a slip angle difference between said estimated slip angle and said target slip angle exceeds a threshold slip angle for starting braking control based on slip angle, judges which is a main cause, due to which said yaw rate difference exceeds said threshold yaw rate, between a change in said yaw rate and a change in said target yaw rate when said yaw rate difference exceeds said threshold yaw rate, and then changes at least one of said threshold slip angel and said braking force applied through said braking control based on yaw rate according to said main cause.

21. A system of driving stability control for a vehicle which controls braking force applied independently to respective front and rear wheels to control a slip and a spin of said vehicle, said system of driving stability control comprising:

a master cylinder operative to generate hydraulic pressure according to operations of a brake pedal of said vehicle;

a pressure intensifier operative to intensify said hydraulic pressure;

a hydraulic pressure control unit operative to distribute said hydraulic pressure to brake units for front and rear, right and left wheels, respectively;

a speed sensor operative to detect a running speed of said vehicle;

a yaw rate sensor operative to detect a yaw rate of said vehicle;

a lateral acceleration sensor operative to detect a lateral acceleration of said vehicle; and a braking force control unit operative to control said hydraulic pressure control unit on the basis of said running speed, said yaw rate and said lateral acceleration so as to control said braking force applied to each said wheel;

wherein said braking force control unit determines an estimated slip angle of a slip occurring in said vehicle, a target yaw rate of said vehicle and a target slip angle of said vehicle on the basis of said running speed, said yaw rate and said lateral acceleration, controls said braking force so as thereby to bring said estimated slip angle into said target slip angle when a slip angle difference between said estimated slip angle and said target slip angle exceeds a threshold slip angle for starting braking control, judging which is a main cause, due to which said change rate of said yaw rate difference exceeds said specified change rate, between said yaw rate and said target yaw rate exceeds a predetermined rate between a change in said yaw rate and a change in said target yaw rate when a change rate of a yaw rate difference between said yaw rate and said target yaw rate exceeds a specified change rate, and than changes said threshold slip angle according to said main cause.

22. A system of driving stability control for a vehicle which controls braking force applied independently to respective front and rear wheels to control a slip and a spin of said vehicle, said system of driving stability control comprising:

a master cylinder operative to generate hydraulic pressure according to operations of a brake pedal of said vehicle;

a pressure intensifier operative to intensify said hydraulic pressure;

a hydraulic pressure control unit operative to distribute said hydraulic pressure to brake units for front and rear, right and left wheels, respectively;

a speed sensor operative to detect a running speed of said vehicle;

a yaw rate sensor operative to detect a yaw rate of said vehicle;

a lateral acceleration sensor operative to detect a lateral acceleration of said vehicle; and a braking force control unit operative to control said hydraulic pressure control unit on the basis of said running speed, said yaw rate and said lateral acceleration so as to control said braking force applied to each said wheel;

wherein said braking force control unit determines an estimated slip angle of a slip occurring in said vehicle and a target slip angle of said vehicle on the basis of said running speed, said yaw rate and said lateral acceleration, controls said braking force so as thereby to bring said estimated slip angle into said target slip angle when a slip angle difference between said estimated slip angle and said target slip angle exceeds a threshold slip angle for starting braking control, judges which is a main cause, due to which said change rate of said slip angle difference exceeds a specified change rate, between a change in said estimated slip angle and a change in said target slip angle when a change rate of said slip angle difference exceeds said specified change rate, and then changes at least one of said threshold slip angle and said braking force applied through said braking control according to said main cause.

* * * * *